US012687739B2

(12) United States Patent
Hirata et al.

(10) Patent No.: US 12,687,739 B2
(45) Date of Patent: Jul. 21, 2026

(54) SPACE FLOATING VIDEO DISPLAY APPARATUS AND LIGHT SOURCE APPARATUS

(71) Applicant: Maxell, Ltd., Kyoto (JP)

(72) Inventors: Koji Hirata, Kyoto (JP); Koji Fujita, Kyoto (JP); Toshinori Sugiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 437 days.

(21) Appl. No.: 18/031,362

(22) PCT Filed: Sep. 24, 2021

(86) PCT No.: PCT/JP2021/035065
§ 371 (c)(1),
(2) Date: Apr. 12, 2023

(87) PCT Pub. No.: WO2022/080117
PCT Pub. Date: Apr. 21, 2022

(65) Prior Publication Data
US 2023/0375854 A1    Nov. 23, 2023

(30) Foreign Application Priority Data
Oct. 12, 2020    (JP) ................................ 2020-171858

(51) Int. Cl.
*G02B 30/56*    (2020.01)
*G02F 1/1335*    (2006.01)
(Continued)

(52) U.S. Cl.
CPC ....... *G02B 30/56* (2020.01); *G02F 1/133528* (2013.01); *G09G 3/36* (2013.01); *H04N 13/302* (2018.05)

(58) Field of Classification Search
CPC ...................................................... G02B 30/56
See application file for complete search history.

(56) References Cited

U.S. PATENT DOCUMENTS

| 5,892,491 A | 4/1999 | Fukatsu |
| 2004/0257788 A1 | 12/2004 | Huber |
| (Continued) |

FOREIGN PATENT DOCUMENTS

| JP | H07-248872 A | 9/1995 |
| JP | H08-161987 A | 6/1996 |
| (Continued) |

OTHER PUBLICATIONS

International Search Report and Written Opinion mailed on Dec. 7, 2021, received for PCT Application PCT/JP2021/035065, filed on Sep. 24, 2021, 14 pages including English Translation.
(Continued)

*Primary Examiner* — Edmond C Lau
(74) *Attorney, Agent, or Firm* — XSENSUS LLP

(57) ABSTRACT
The present disclosure enables a space floating video having few ghosts to be obtained, and a space floating video apparatus suitable for inputting without causing fewer erroneous operations. The space floating video display apparatus includes: a display panel for displaying a video; a light source apparatus that supplies light of a specific polarization direction to the display panel; a retroreflection plate for reflecting video light from the display panel and displaying a space floating video of real image in air by means of the reflected light; and a light-shielding member that, among a plurality of space floating videos which are formed by the video light from the display panel, blocks a portion of the video light that is likely to form a space floating video other than desired space floating videos.

20 Claims, 17 Drawing Sheets

(51) Int. Cl.
  *G09G 3/36* (2006.01)
  *H04N 13/302* (2018.01)

(56) References Cited

U.S. PATENT DOCUMENTS

| | | | |
|---|---|---|---|
| 2010/0110384 A1 | 5/2010 | Maekawa | |
| 2011/0285680 A1 | 11/2011 | Nakamura | |
| 2013/0155030 A1 | 6/2013 | Kawai et al. | |
| 2017/0099480 A1 | 4/2017 | Kaneda et al. | |
| 2017/0261759 A1* | 9/2017 | Yamamoto | G02B 5/3083 |
| 2018/0031878 A1 | 2/2018 | Koito et al. | |
| 2018/0259810 A1* | 9/2018 | Numata | G02F 1/133528 |
| 2019/0196213 A1 | 6/2019 | Yamamoto et al. | |
| 2019/0221168 A1 | 7/2019 | Sako et al. | |
| 2019/0227489 A1 | 7/2019 | Tokuchi | |
| 2019/0243469 A1 | 8/2019 | Kuribayashi | |
| 2019/0265472 A1 | 8/2019 | Sugiyama et al. | |

FOREIGN PATENT DOCUMENTS

| | | | |
|---|---|---|---|
| JP | H09-105929 A | 4/1997 | |
| JP | 2000-020196 A | 1/2000 | |
| JP | 2001-201729 A | 7/2001 | |
| JP | 2011-242616 A | 12/2011 | |
| JP | 2015-194601 A | 11/2015 | |
| JP | 2018-018003 A | 2/2018 | |
| JP | 2019-003081 A | 1/2019 | |
| JP | 2019-040096 A | 3/2019 | |
| JP | 2019-109407 A | 7/2019 | |
| JP | 2019-124803 A | 7/2019 | |
| JP | 2019-128722 A | 8/2019 | |
| JP | 2019-133284 A | 8/2019 | |
| JP | 2020-133499 A | 2/2022 | |
| WO | 2008/123500 A1 | 10/2008 | |
| WO | 2012/032851 A1 | 3/2012 | |
| WO | 2018/003861 A1 | 1/2018 | |
| WO | 2018/043673 A1 | 3/2018 | |

OTHER PUBLICATIONS

Office Action issued Oct. 1, 2024, in corresponding Japanese Patent Application 2020-171858, 42pp.

* cited by examiner ( A )

SPACE FLOATING VIDEO DISPLAY APPARATUS AND LIGHT SOURCE APPARATUS

CROSS-REFERENCE TO RELATED APPLICATIONS

The present application is based on PCT filing PCT/JP2021/035065, filed Sep. 24, 2021, which claims priority to JP 2020-171858, filed Oct. 12, 2020, the entire contents of each are incorporated herein by reference.

TECHNICAL FIELD

The present invention relates to a space floating video display apparatus and a light source apparatus.

BACKGROUND ART

A space floating video display apparatus that displays videos directly externally has been known as a space floating video information display system, and a display method of displaying videos as space images has been known. For example, Patent Document 1 discloses a method of performing an input operation to space images.

RELATED ART DOCUMENTS

Patent Documents

Patent Document 1: Japanese Patent Application Laid-open No. 2019-128722

SUMMARY OF THE INVENTION

Problems to be Solved by the Invention

However, in the above-mentioned conventional technique, as a specific means for improving quality of the videos displayed in the space floating video information display system or as a method of reducing erroneous inputs, for example, no consideration is given about design optimization including a light source of a video display apparatus, which becomes a video source of space floating videos.

Therefore, the present invention has an object to provide a technique capable of displaying suitable videos, in which visibility (appearance resolution and contrast) is high in the space floating video display apparatus, occurrence of ghost images deteriorating quality of the videos is suppressed, and erroneous inputs are reduced as a key input apparatus based on displayed space image.

Means for Solving the Problems

In order to solve the above problems, for example, the configuration described in the patent claims is adopted. The present application includes a plurality of means for solving the above problems and, to give an example thereof, a space floating video display apparatus includes: a display panel for displaying a video; a light source apparatus that supplies light of a specific polarization direction to the display panel; a retroreflection plate for reflecting video light from the display panel and displaying a space floating video of real image in air by means of the reflected light; and a light-shielding member that, among a plurality of space floating videos which are formed by the video light from the display panel, blocks a portion of the video light that is likely to form a space floating video other than desired space floating videos.

Effects of the Invention

According to the present invention, realized can be the space floating information display system that can suitably display the space floating video information and has a sensing function with few erroneous inputs. Problems, configurations, and effects other than those described above will be apparent from the descriptions of the following embodiments.

BRIEF DESCRIPTION OF THE DRAWINGS

FIG. 11 is view showing an example of a specific configuration of the video display apparatus;

FIG. 12 is a sectional view showing an example of a specific configuration of a light source apparatus;

FIG. 13 is a sectional view showing an example of a specific configuration of the light source apparatus;

DETAILED DESCRIPTION OF PREFERRED EMBODIMENTS

Figure 1:
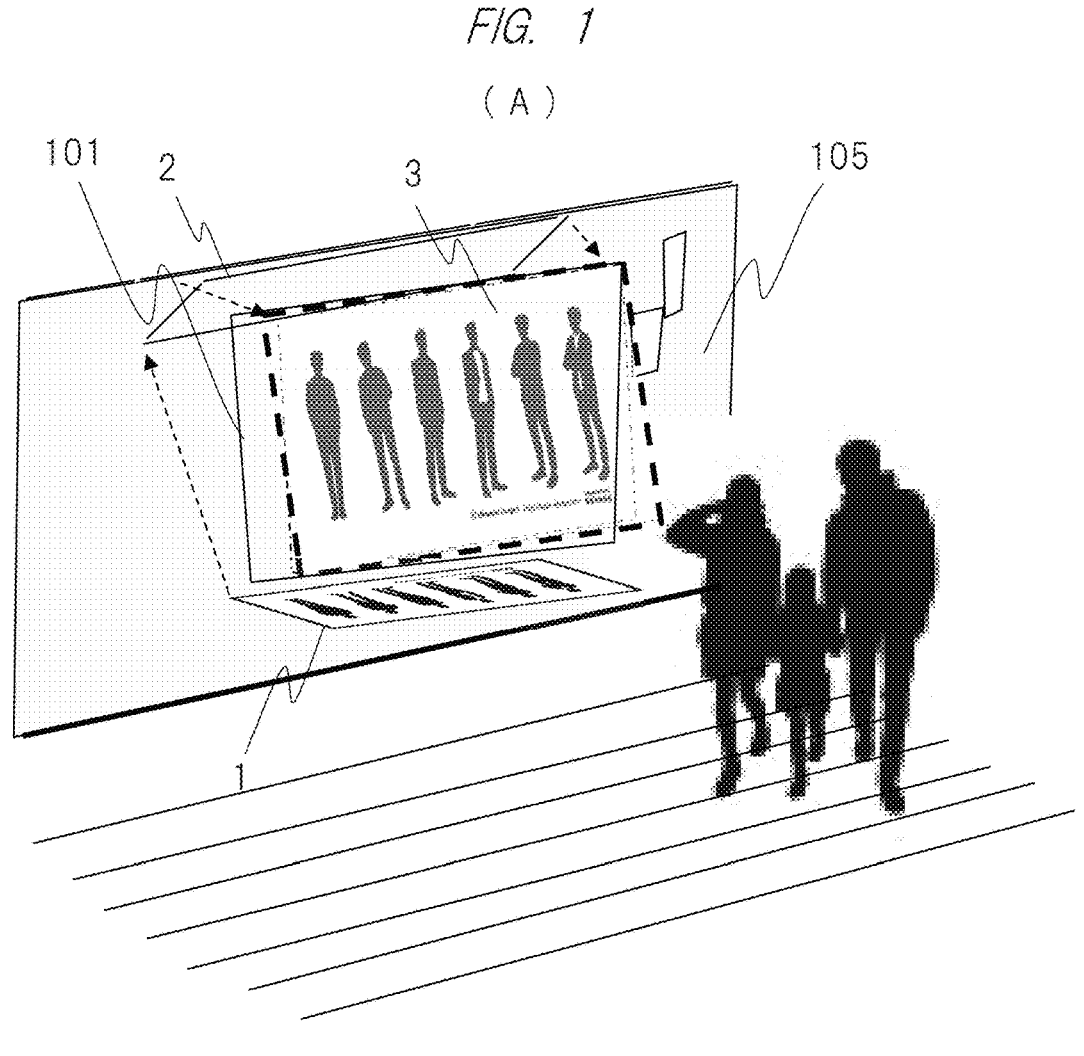
FIG. 1 is a view showing an example of usage form of a space floating video information display system according to one embodiment of the present invention.
Figure 1:
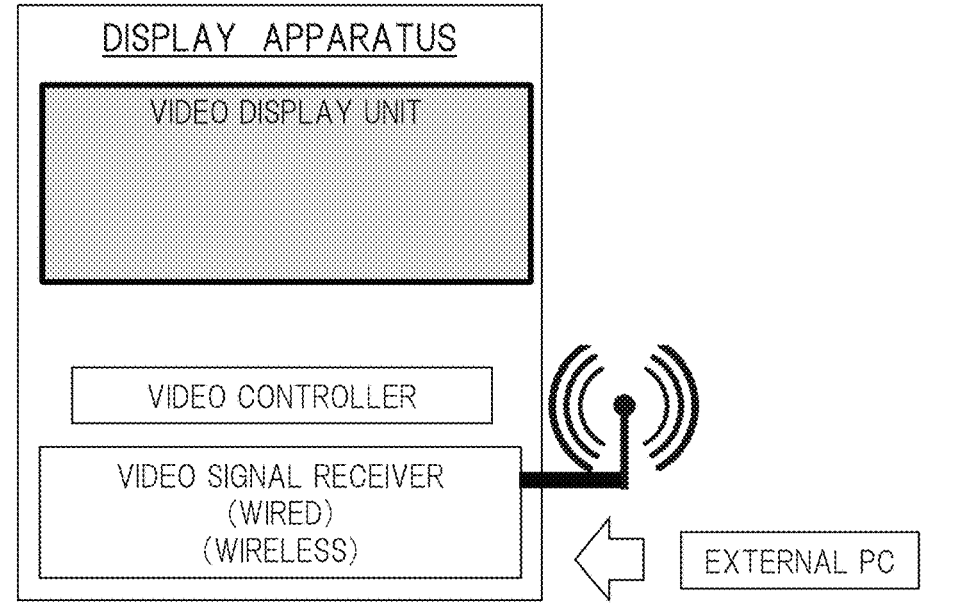

Hereinafter, embodiments of the present invention will be described in detail with reference to the drawings. Incidentally, the present invention is not limited to the descriptions of the embodiments, and various modifications and alternations by those skilled in the art can be made within the scope of technical ideas disclosed in the present specification. Further, in all the drawings for explaining the present invention, the same reference numerals may be given to those having the same function, and a repetitive description thereof may be omitted.

The following embodiment relates to, for example, an information display system in which a video generated by a video light from a large-area video emitting source is transmitted through a transparent member partitioning a space such as a show window glass and is capable of being displayed as a space floating video inside or outside a store (space). Further, it also relates to a large-scale digital signage system configured by using a plurality of such information display systems.

According to the following embodiment, for example, high-resolution video information can be displayed in a space floating state on a glass surface of a show window or a light-transmitting plate material. At this time, by making a divergence angle of an emitted video light small, that is, by making it an acute angle and further aligning it with a specific polarization, only normal reflected light is efficiently reflected to a retroreflector, so that light utilization efficiency is high and it is possible to suppress ghost images generated in addition to main space floating images, which has been a problem in the conventional retroreflection method, and it is possible to obtain clear space floating videos. Further, the apparatus including a light source of the present embodiment can provide a new and highly usable space floating video information display system capable of significantly reducing power consumption. Furthermore, for example, provided can be a space floating video information display system that is capable of visually identifying so-called one-way space floating video display outside a vehicle via a shield glass including a windshield, a rear glass, and a side glass of the vehicle.

Meanwhile, in the conventional space floating video information display system, a combination of an organic EL panel or a liquid crystal panel with a retroreflector is used as a high-resolution color display video source. In the space floating video display apparatus by the conventional technique, a video light is diffused at a wide angle. Further, a retroreflector is a hexahedron. Consequently, besides a reflected light that is normally reflected, a ghost image is generated by the video light that is obliquely incident on the retroreflector 2a as shown in FIG. 2(C), which impairs image quality of the space floating video. Since the retroreflector shown as the conventional technique is a hexahedron, as shown in FIG. 3 besides a normal space floating video (normal image) R1, a plurality of ghost images of a first ghost image G1 to a sixth ghost image G6 are generated. For this reason, the same ghost image as the space floating video is monitored by a person(s) other than an observer, which poses a big problem in terms of security.

In addition, a problem peculiar to the space floating video information display system has been clarified, the problem being that an erroneous input in which a key different from the key selected by the observer is selected due to a deviation between the selected space floating image and an observer's line of sight occurs.

Space Floating Video Information Display System

1

FIG. 1 is a diagram showing an example of usage form of a space floating video information display system according to an embodiment of the present invention. FIG. 1(A) is a diagram showing an overall configuration of a space floating video information display system according to the present embodiment. For example, in a store or the like, a space is partitioned by a show window (also referred to as a "window glass") 105, which is a translucent member such as glass. The space floating information display system of the present embodiment makes it possible to display a floating video in one direction to an outside of the store (space) by transmitting through the translucent member. Specifically, a light having a narrow directional characteristic and a specific polarization is emitted from a video display apparatus 1 as a video light flux, is once incident on the retroreflector 2, is retroreflected and transmits the window glass 105, and forms a space image 3 (space floating image 3) which is a real image outside the store. In FIG. 1, an inside of the window glass 105 (in the store) is shown in a depth direction so that its outside (for example, a sidewalk) is in front of the window glass 105. On the other hand, it is also possible to reflect the specific polarization by providing the window glass 105 with a means for reflecting the specific polarization, and to form a space image at a desired position in the store.

FIG. 1(B) is a block diagram showing a configuration of the above-mentioned video display apparatus 1. The video display apparatus 1 includes: a video display unit that displays the original image of the space image; a video controller that converts an inputted video according to resolution of the panel; and a video signal receiver that receives a video signal. The video signal receiver handles wired input signals such as HDMI (High-Definition Multimedia Interface) inputs and wireless input signals such as Wi-Fi (Wireless Fidelity), and functions by itself as a video receiving/displaying apparatus, thereby being also capable of displaying video information from tablets, smartphones, and the like. Furthermore, by connecting a stick PC or the like, it is possible to have capabilities such as a calculation processing and a video analysis processing.

Figure 2:
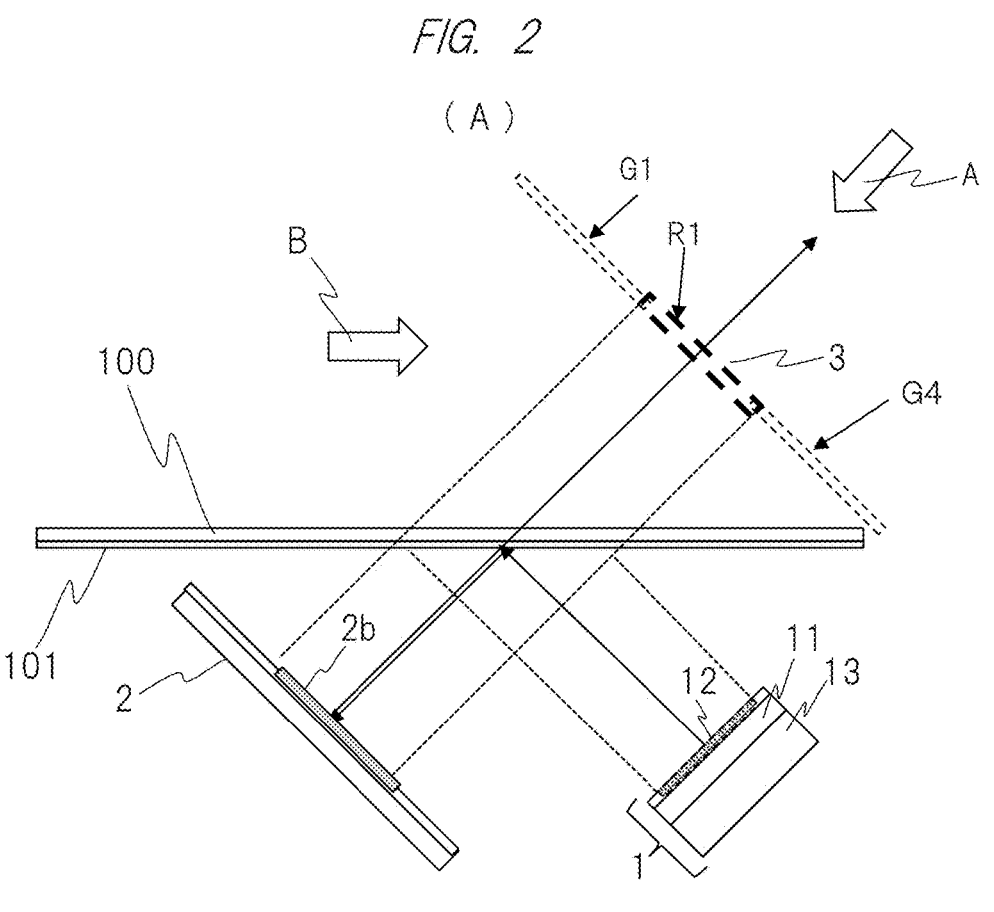
FIG. 2 is a view showing an example of a main part configuration and a retroreflection portion configuration of the space floating video information display system according to the embodiment of the present invention.
Figure 2:
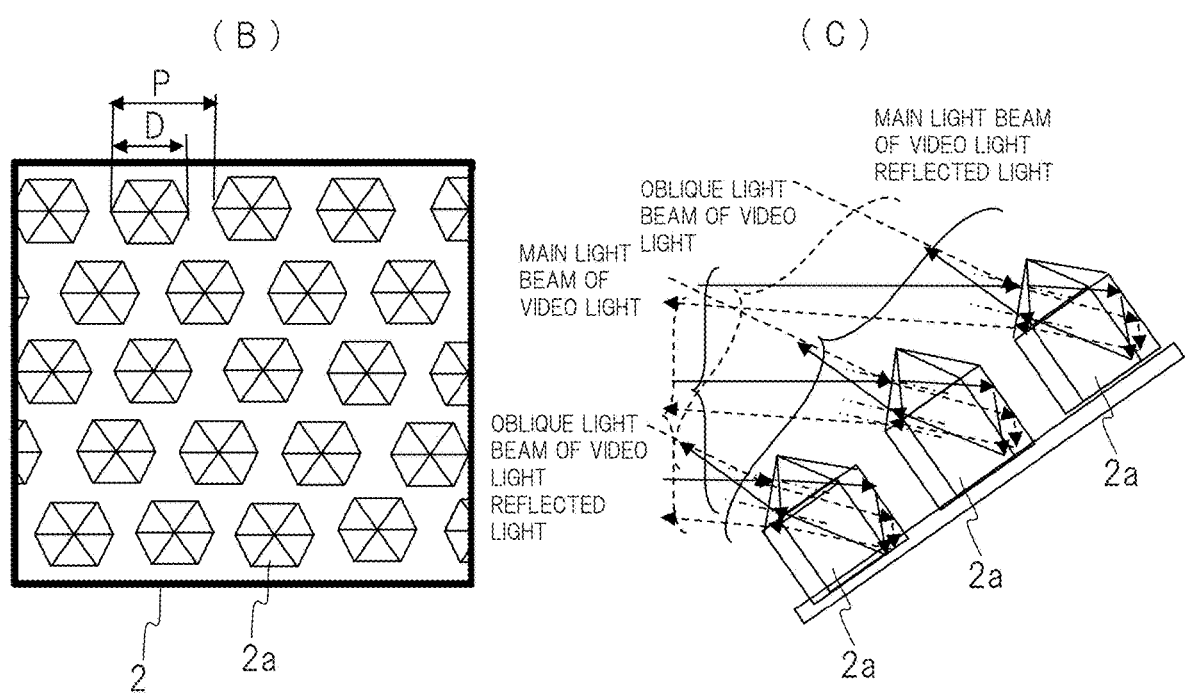
Figure 3:
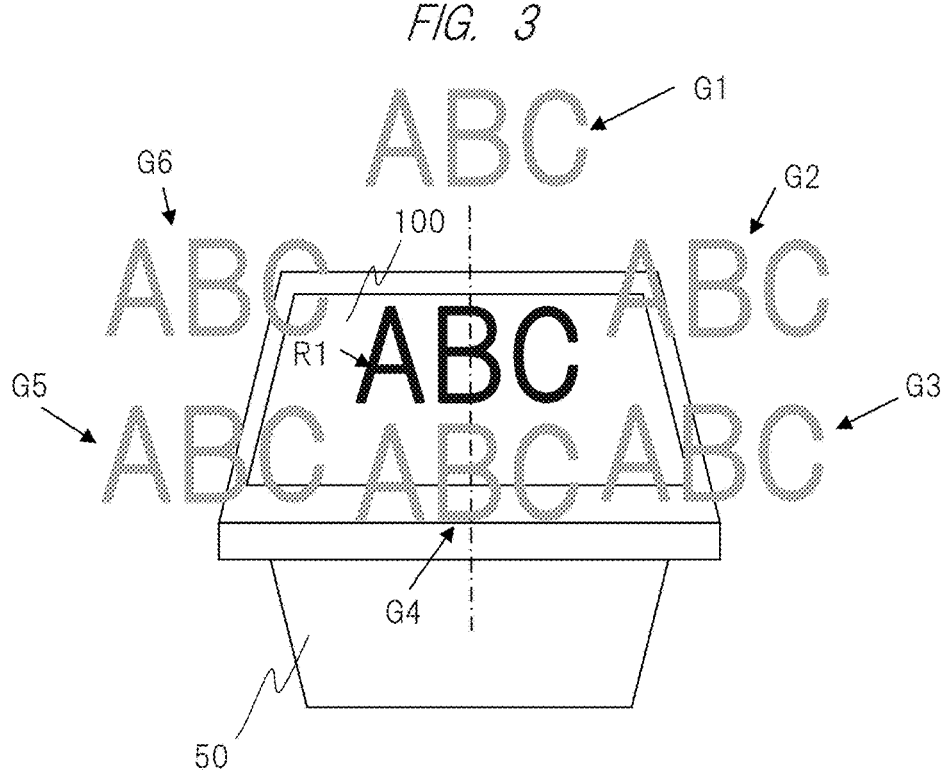
FIG. 3 is a view showing a problem of the space floating video information display system.

FIG. 2 is a view showing an example of a main part configuration and a retroreflection portion configuration of the space floating video information display system according to the embodiment of the present invention. The configuration of the space floating video information display system will be described more specifically with reference to FIG. 2. As shown in FIG. 2(A), a video display apparatus 1 for diverging a video light having a specific polarization in a narrow angle is provided in an oblique direction of a translucent member 100 such as glass. The video display apparatus 1 includes a liquid crystal display panel (video display element, liquid crystal panel) 11 and a light source apparatus 13 that generates a specific polarization light having a narrow-angle diffusion characteristic.

The specific polarization video light from the video display apparatus 1 is reflected by a polarization separation member 101 (in the figure, the polarization separation member 101 is formed like a sheet shape and bonded to the transparent member 100), which is provided to a transparent member 100 and has a film for selectively reflecting the specific polarization video light, and is incident on the retroreflector 2. A λ/4 plate 2b is provided on a video light incident surface of the retroreflector 2. The video light is polarized and converted from the specific polarization to the other polarization by being passed through the λ/4 plate 2b twice in being incident on the retroreflector 2 and in being emitted therefrom. Here, since the polarization separation member 101 that selectively reflects the specific polarization video light has the property of transmitting a polarization light of the other polarization that has been polarized, the specific polarization video light after the polarization conversion transmits the polarization separation member 101. The video light transmitting the polarization separation member 101 forms a space floating video 3, which is a real image, outside the transparent member 100.

Incidentally, the light forming the space floating image 3 is a set of light beams that converge from the retroreflector 2 to an optical image of the space floating image 3, and these light beams travel straight even after passing through the optical image of the space floating image 3. Therefore, the space floating image 3 is different from a diffused video light formed on a screen by a general projector or the like, and is a video having high directivity. Therefore, in the configuration of FIG. 2, when a user visually recognizes it from a direction of an arrow A, the space floating image 3 is visually recognized as a bright image. Meanwhile, when another person visually recognizes it from a direction of an arrow B, the space floating image 3 cannot be visually recognized as a video at all. This characteristic is very suitable for use in a system that displays a video requiring high security or a video having highly confidential and desired to be kept secret from the person facing the user.

Incidentally, depending on performance of the retroreflector 2, polarization axes of the reflected video light may be uneven. In this case, a part of the video light whose polarization axes are not aligned is reflected by the above-mentioned polarization separation member 101 and returns to the video display apparatus 1. This light may be re-reflected on a video display surface of the liquid crystal display panel 11 constituting the video display apparatus 1, generate a ghost image, and may deteriorate the image quality of the space floating image. Therefore, in the present embodiment, an absorption type polarizer 12 is provided on the video display surface of the video display apparatus 1. The above re-reflection can be suppressed by transmitting the video light emitted from the video display apparatus 1 through the absorption type polarizer 12 and absorbing the reflected light returned from the polarization separation member 101 by the absorption type polarizer 12. This makes it possible to prevent the image quality from deteriorating due to the ghost image of the space floating image.

The above-mentioned polarization separation member 101 may be formed of, for example, a reflective type polarizer or a metal multilayer film that reflects a specific polarization.

Next, as a typical retroreflector 2 in FIG. 2(B), a surface shape of a retroreflector manufactured by Nippon Carbite Industries Co., Ltd. used in this study is shown. A light beam incident on each inside of regularly arranged hexagonal prisms is reflected by a wall surface and a bottom surface of the hexagonal prism and is emitted as a retroreflected light in a direction corresponding to the incident light to form a normal image R1 shown in FIG. 3. Meanwhile, as shown in FIG. 2(C), the ghost image (G1 to G6 in FIG. 3) is formed separately from the normal image R1 depending on the video light that is obliquely incident on the retroreflector in the video light from the video display apparatus 1.

A space floating video which is a real image is displayed based on a video displayed on the video display apparatus 1 of the present invention. The resolution of this space floating image largely depends on a diameter D and a pitch P of a retroreflection portion of the retroreflector 2 shown in FIG. 2(B) besides the resolution of the liquid crystal display panel 11. For example, when a 7-inch WUXGA (1920×1200 pixels) liquid crystal display panel is used, one pixel of the space floating image is equivalent to 300 μm even if one pixel (1 triplet) is about 80 μm, for example, if the diameter D of the retroreflection portion is 240 μm and the pitch is 300 μm. Therefore, the effective resolution of the space floating video is reduced to about ⅓. Therefore, in order to make the resolution of the space floating video equal to the resolution of the video display apparatus 1, it is desired that the diameter and the pitch of the retroreflection portion are made closer to one pixel of the liquid crystal display panel. On the other hand, in order to suppress occurrence of moire due to the pixels of the retroreflector and the liquid crystal display panel, it is preferable to design them by removing each pitch ratio from the integral multiple of one pixel. Further, it is preferable to arrange such a shape that all sides of the retroreflector do not overlap with any one side of one pixel of the liquid crystal display panel.

Meanwhile, in order to manufacture the retroreflector at a low price, it is preferable to mold it by using a roll press method. Specifically, it is a method of aligning recursive parts and shaping them on a film. An inverted shape of a shape to be shaped is formed on each roll surface, an UV curable resin is applied onto a fixing base material and is caused to pass through a space between the rolls, is shaped to a required shape and cured by irradiating it with ultra-violet rays to obtain the retroreflector 2 having a desired shape.

The video display apparatus 1 of the present invention is a structurally excellent system in which, by the liquid crystal display panel 11 and the light source apparatus 13 detailed later and generating the light with a specific polarization having a narrow angle diffusion characteristic, there is a small possibility that the video is incident from an oblique angle with respect to the retroreflector 2 and that ghosts occur, and brightness is low even if the ghosts occur.

Space Floating Video Information Display System 2

Figure 4:
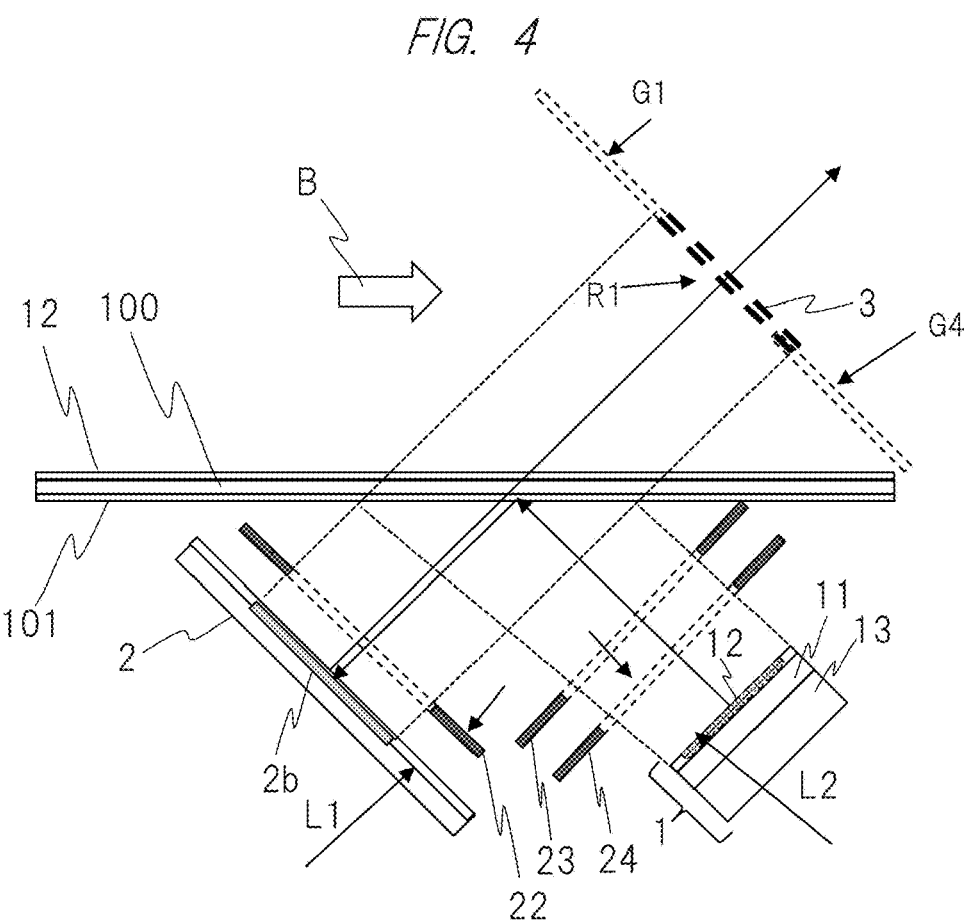
FIG. 4 is a view showing another example of the main part configuration of the space floating video information display system according to the embodiment of the present invention.

FIG. 4 is a diagram showing another example of a configuration of a main part of the space floating video information display system according to the embodiment of the present invention. The video display apparatus 1 is configured by including a liquid crystal display panel 11 as a video display element 11 and a light source apparatus 13 that generates a light with a specific polarization having a narrow-angle diffusion characteristic. The liquid crystal display panel 11 is configured by parts of a small one having a screen size of about 5 inches to a large liquid crystal display panel having a screen size of more than 80 inches. For example, the polarization separation member 101 such as a reflective polarizer reflects the video light from the liquid crystal display panel toward the retroreflector 2.

The λ/4 plate 2*b* is provided on a light incident surface of the retroreflector 2, and the video light is polarized and converted by passing the retroreflector twice to convert the specific polarization to the other polarization, thereby being caused to transmit the polarization separation member 101 and displaying the space floating video 3, which is a real image, outside the transparent member 100. An absorption type polarizer is provided on an external light incident surface of the transparent member 100. In the polarization separation member 101 described above, the polarization axes become uneven due to retroreflection, so that a part of the video light is reflected and returns to the video display apparatus 1. This light is reflected again on the video display surface of the liquid crystal display panel 11 constituting the video display apparatus 1, generates the ghost image, and significantly deteriorates the image quality of the space floating image. Therefore, in the present embodiment, an absorption type polarizer 12 is provided on the video display surface of the video display apparatus 1, the video light is caused to transmit it and to absorb the above-mentioned reflected light, thereby preventing the image quality from deteriorating due to the ghost image of the space floating image. Further, in order to alleviate deterioration of image quality due to sunlight or illumination light from outside the apparatus, it is preferable to provide the absorption type polarizer 12 on a surface of the window glass 105 made of the transparent member. The polarization separation member 101 is configured by, for example, a reflective polarizer or a metal multilayer film that reflects a specific polarization.

A difference from the example shown by FIG. 2 in FIG. 4 is that light-shielding members 24 and 23 for blocking an oblique video light other than the normal video light forming a space floating image are provided between the polarization separation member 101 and the liquid crystal display panel 11. Further, in FIG. 4, a light-shielding member 22 for blocking an oblique video light other than the normal video light is also provided between the retroreflection portion 2 and the polarization separation member 101, thereby blocking the oblique light that generates the ghost images. As a result, the generation of ghost images can be suppressed.

The inventors have confirmed through experiments that the light-shielding effect can be enhanced by providing the light-shielding member 24 and the light-shielding member 23 in the space between the liquid crystal panel 11 and the polarization separation member 101. In this experiment, each inner diameter of the light-shielding members 23 and 24 is set to 110% of an area with respect to a region through which a normal video light flux forming the space floating videos passes, so that component accuracy can be created and assembled within a range of machine tolerance. Further, in order to further reduce the generation of the ghost images, if a ratio is 104% or less with respect to a region through which the normal video light flux of the above-mentioned light-shielding member passes, the occurrence of the ghost images could be suppressed to a level where there is no practical problem. Meanwhile, if the light-shielding member 22 provided between the retroreflector 2 and the polarization separation member 101 is installed at such a position that a distance L1 between the light-shielding member 22 and the retroreflector 22 is 50% or less with respect to a distance between the retroreflector 22 and the polarization separation member 101, the occurrence of the ghost images can be further reduced. Furthermore, if the light-shielding member 22 is installed at such a position that the distance L1 between the light-shielding member 22 and the retroreflector 22 is 30% or less with respect to the distance between the retroreflector 22 and the polarization separation member 101, the occurrence of the ghost images could be reduced up to such a level that no problem arose practically by sight. The occurrence could be further reduced to a ghost level by providing the light-shielding member 22, the light-shielding member 23, and the light-shielding member 24 together.

Figures 5, 6:
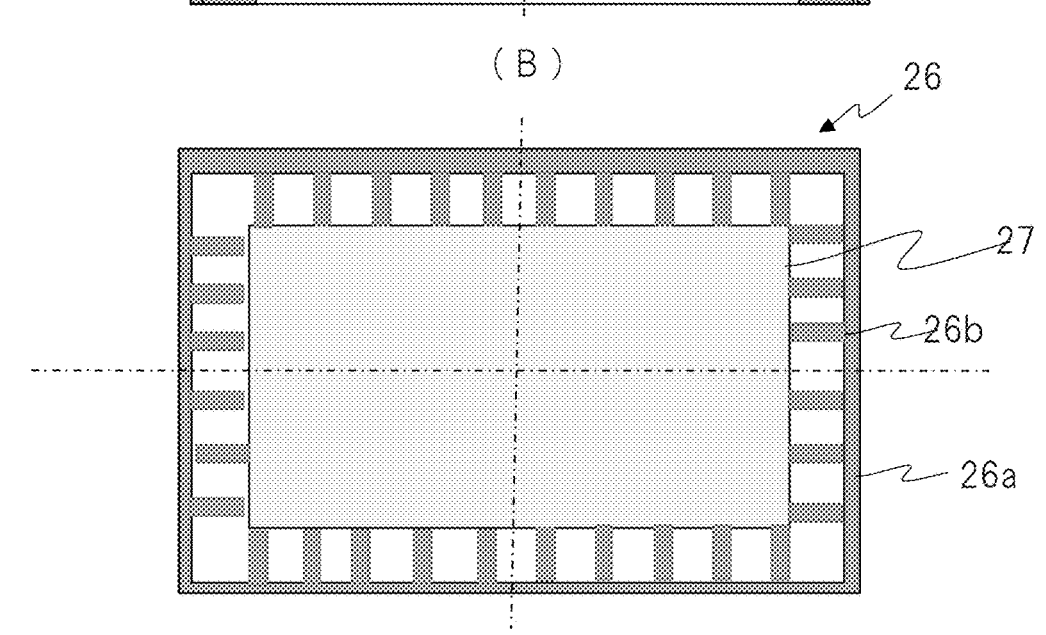
FIG. 5 is a view showing an example of a light-shielding member which reduces generation of ghost images of the space floating video information display system according to the embodiment of the present invention.
FIG. 6 is a view showing another example of the light-shielding member which reduces the generation of the ghost images of the space floating video information display system according to the embodiment of the present invention.

FIG. 5 is a diagram showing an example of a light-shielding member that reduces the occurrence of the ghost images in the space floating video information display system according to the embodiment of the present invention. FIG. 5(A) shows a cross-sectional shape of the embodiment of the light-shielding member described above. FIG. 5(B) shows a planar shape of the embodiment of the above-mentioned light-shielding member, and shows an effective area of a light-shielding member 25 with respect to a region 27 through which the normal video light flux forming the space floating video passes. In an example of FIG. 5(B), the region 27, through which the normal video light flux passes, is set smaller than a light-shielding member outer frame 25*a*.

FIG. 6 is a diagram showing another example of a light-shielding member that reduces the occurrence of the ghost images in the space floating video information display system according to the embodiment of the present invention. FIG. 6(A) shows a cross-sectional shape of another embodiment of the light-shielding member. FIG. 6(B) shows a planar shape of another embodiment of the light-shielding member, and shows a configuration, in which an effective area of a light-shielding member 26 with respect to the region 27 through which the normal video light flux forming the space floating video passes, is set to be substantially the same size. In the example of FIG. 6, a beam 26*b* is provided toward an inside of a light-shielding member outer frame 26*a*. This makes it possible to further absorb, by reflecting an abnormal light forming the ghost image on a surface of the beam 26*b* a plurality of times, the abnormal light. The region 27 through which the normal video light flux passes is made smaller than the light-shielding member outer frame 26*a*, and has an area equivalent to that of an inscribed surface of the beam 26*b*.

On the other hand, even if the ghost image is generated by an oblique video light reflected by the retroreflector 2, a shape of the retroreflector 2 is a concave surface or a convex surface having a curvature radius of 200 mm or more from a planar shape facing the video display apparatus 1, so that it is preferably to be unable to monitor the ghost image generated later by moving it away from the observer's view. When this curvature radius is set to 100 mm or less, a new problem arises in which an amount of light reflected normally among the lights reflected around the retroreflection portion 2 decreases and an amount of peripheral light of the obtained space floating video decreases.

Therefore, in order to reduce the ghost image up to a level at which there is no practical problem, it is advisable to select and apply the above-mentioned technical means or to use them in combination.

Video Display Method of Space Floating Video Information Display System

Figure 7:
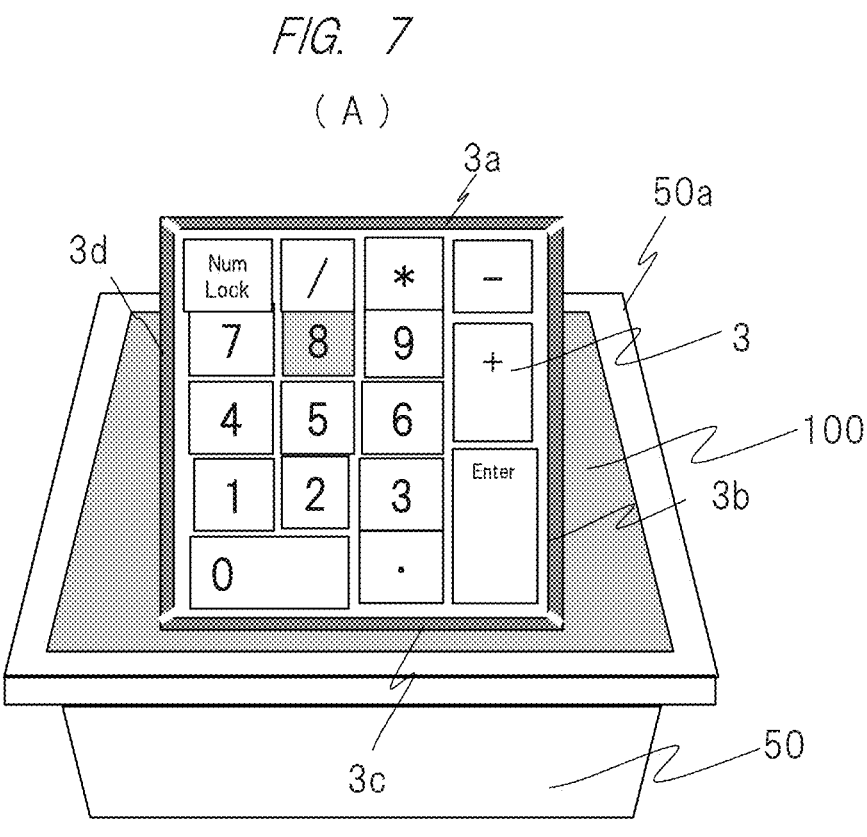
FIG. 7 is a drawing for explaining a display method for preventing erroneous inputs, which is used in the space floating video information display system.
Figure 7:
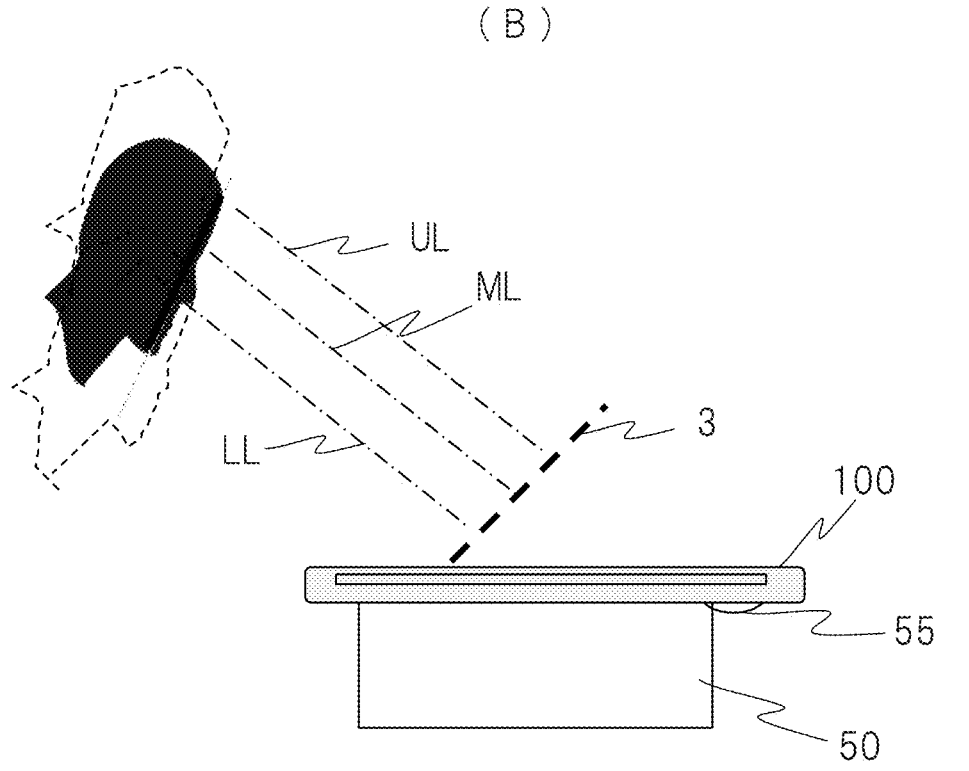

FIG. 7 is an explanatory diagram for explaining a display method for preventing erroneous inputs used in the space floating video information display system. FIG. 7(A) is a diagram showing an example of display of a space floating video information display system. As described above, a video display element 11 constituting the video display apparatus 1 includes a liquid crystal display panel (liquid crystal panel in the embodiment) 11 and a light source apparatus 13 that generates light of a specific polarization having a narrow-angle diffusion characteristic, and can also be configured from a small screen size of about 5 inches to a large liquid crystal display panel exceeding 80 inches. For example, the polarization separation member 101 such as a reflective polarizer reflects the video light from the liquid crystal display panel toward the retroreflection portion 2. Since the space floating video 3 is formed by light rays having high directivity, the air floating image 3 is visually recognized as a bright video when visually recognized from a monitoring direction shown in (B). However, when the observer operates at a correct position with respect to the space floating video information system and the observer's line of sight is in the ML, the observer can recognize all the space floating images 3 as shown in FIG. 7 (A).

Meanwhile, the inventors have found that when the light source apparatus 13 having a narrow-angle diffusion characteristic is combined with the video display element 11 and when a position of the observer's eyes is not the optimum position, for example, it is difficult to visually recognize the video at a lower part of the space floating video 3 in order for the observer to visually recognize it along an eye line UL shown in FIG. 7(B). Considering this from the opposite viewpoint, there is little risk of the space floating video 3 being looked into by anyone other than the observer, and it was effective in ensuring security.

On the other hand, the inventor examined a method in which the space floating image can be easily touched at the optimum monitoring position. In the space floating video information display system shown in the present embodiment, as shown in FIG. 7(B), a camera unit that determines whether a observer's standing position is good or bad is provided on a part of a main body 50 of the space floating video information display system. The inventor has found that the camera unit 55 determines a position and a direction of the observer's face, if necessary, a pupil position and that, by changing lighting states of the optimum monitoring position display units 3a, 3b, 3c, 3d arranged on four outer sides of a key video of the space floating video shown in FIG. 7(A), the observer (user) would well to be guided to the optimum position ML. For example, when the observer monitors the space floating video below the optimum position, the observer (user) can be guided to the optimum position ML by turning off or the like the optimum monitoring position display unit 3a to switch the lighting states of displayed portions of the four sides. Further, it is also possible to reduce power consumption and improve visibility of the space floating video information system by automatically adjusting brightness of the displayed video based on brightness information of an outside (outside world) from the above-mentioned camera unit 55.

Figure 8:
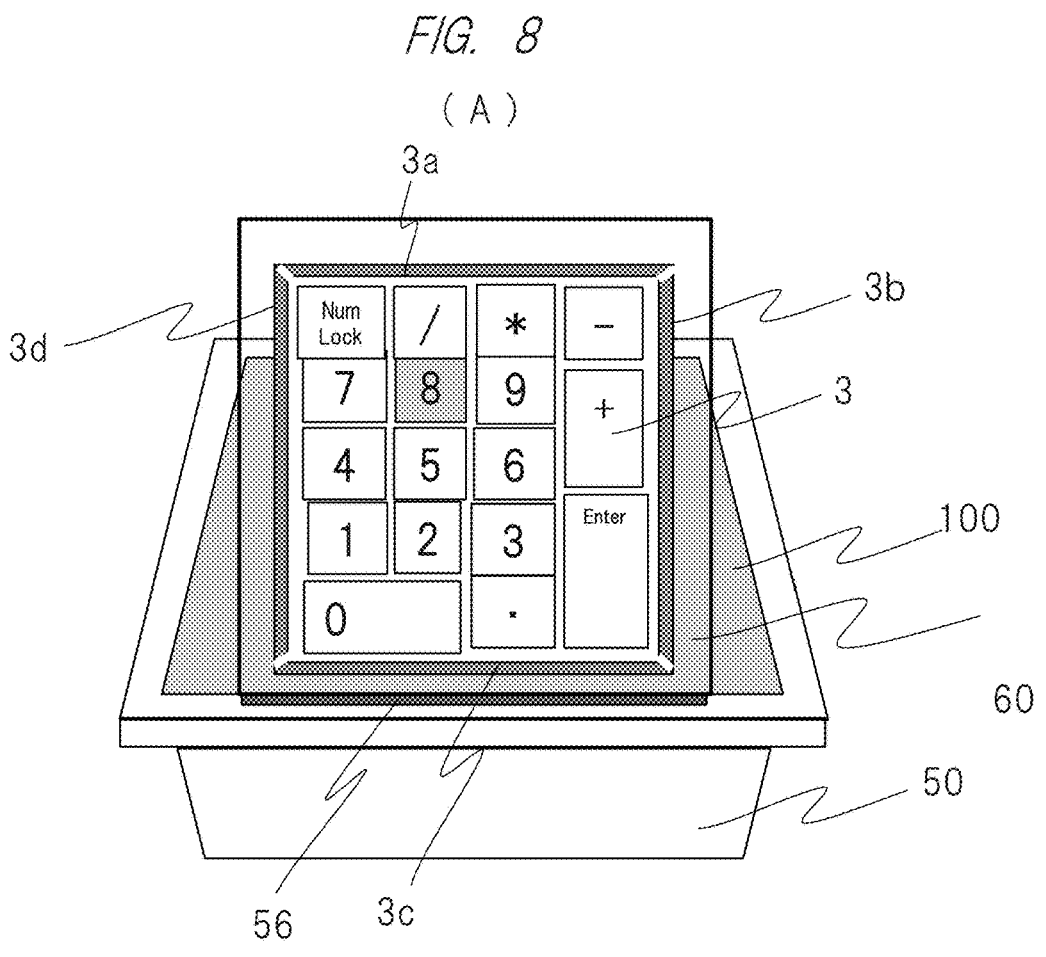
FIG. 8 is a drawing for explaining a display system structure for preventing the erroneous inputs, which is used in the space floating video information display system.
Figure 8:
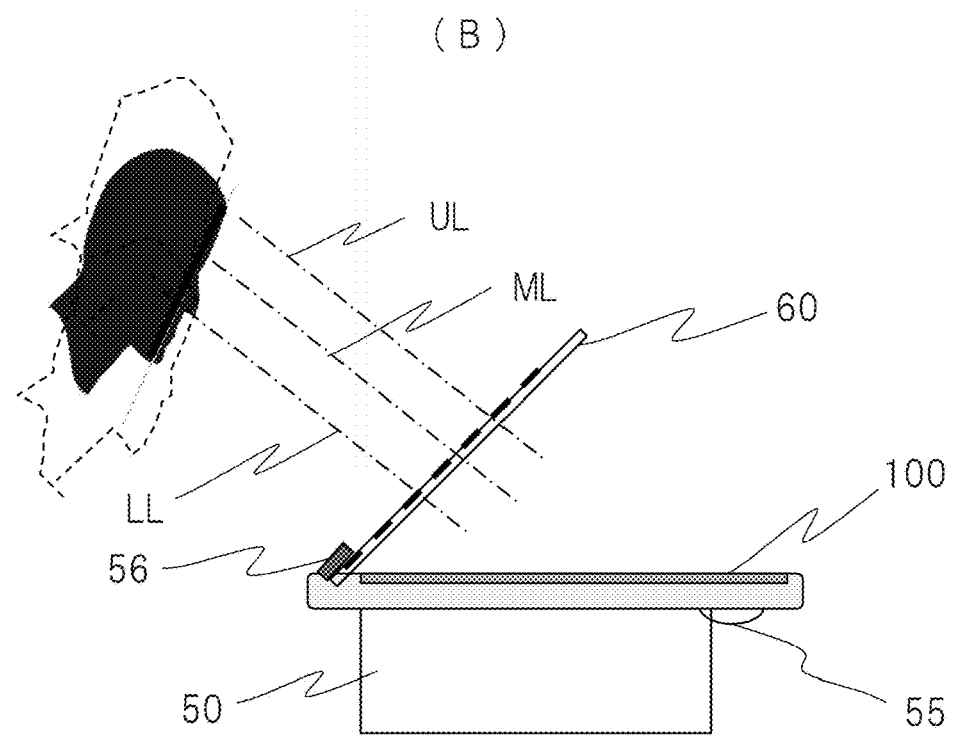

Furthermore, when the observer uses the space floating video information display system, a new problem has been found that it is difficult to determine a position where a video floats. In order to solve this, the inventors have found that the observer can easily determine a displayed position of a space floating video in a three-dimensional space by providing, for example, a transparent structural member 60 for position recognition at a position where a floating video is displayed as shown in FIGS. 8(A) and 8(B). Therefore, in FIG. 8, the sensor 56 having a TOF (Time of Fly) function is arranged on a lower portion of the space floating video so as to sense a relationship between an object such as a monitor's finger and a distance and position of the sensor 56 and an object such as a monitor's finger with respect to the space floating video. The sensor 56 can detect not only coordinates in a plane direction of the object but also a moving direction and a moving speed of the object. In order to read a two-dimensional distance and position, the sensor 56 has a configuration in which a plurality of combinations of infrared light emitter and light receiver are linearly arranged, and the light from the infrared light emitter is irradiated to the object and the reflected light is received by the light receiver. By multiplying a speed of light by a time difference between a time of light emission and a time of light reception, the distance to the object becomes clear. Further, the coordinates on the plane can be read, by the plurality of infrared light emitters and light receivers, from coordinates at a portion at which the time difference between the time of light emission and the time of light reception is the smallest. From the above, three-dimensional coordinate information can also be obtained by combining the coordinates of the object in the plane (two-dimensional) and the plurality of sensors described above.

The inventors also examined a display method in which the space floating video can be visually recognized more clearly. As a result, as shown in FIG. 7, the inventors has found that a part of the space floating video has only to be covered with an outer frame 50a of the main body 50 outside the transparent member 100 serving as a window portion from which the video light is emitted and that, in order to make a floating amount appear larger, a layout of the entire optical system does well to be designed so that a lower end of the floating video covers the outer frame 50a of the main body.

Figure 9:
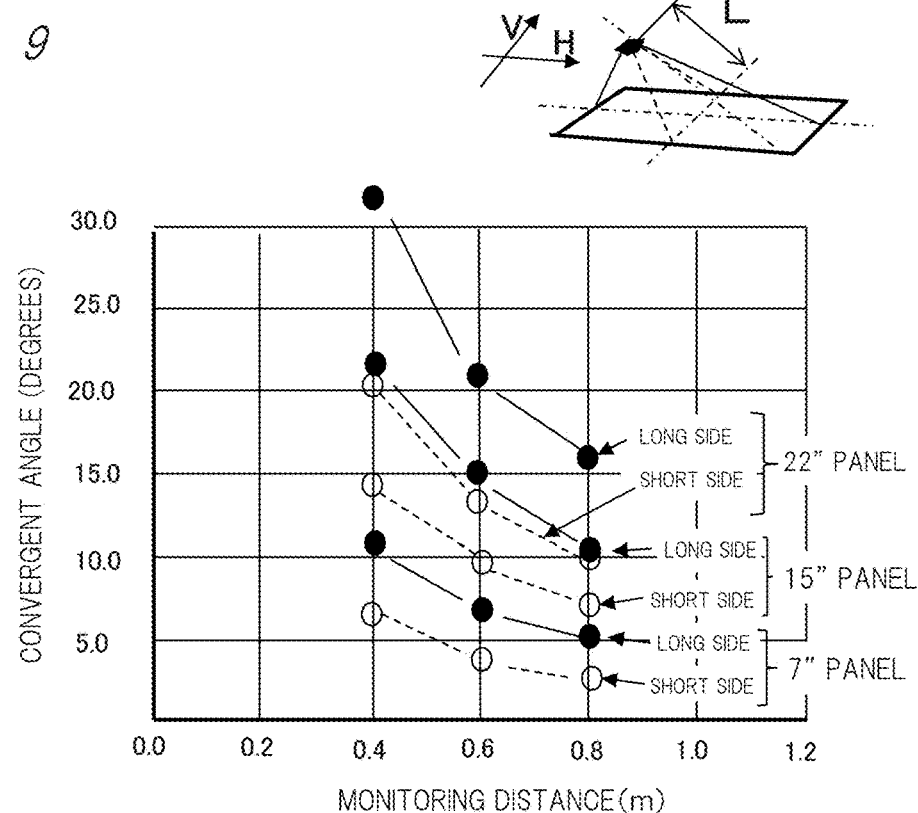
FIG. 9 is a drawing for explaining a light source diffusion characteristic of a video display apparatus.

Optimization of Diffusion Characteristics of Space Floating Video Information Display System When the observer faces a center of the screen in using a large liquid crystal display panel, the brightness of the screen over the entire surface is improved by turning the liquid crystal display panel inward so that the light around the screen is directed toward the observer. FIG. 9 is a graph listing convergence angles of a long side and a short side of the panel when a monitoring distance L from the monitor's panel and a panel size (screen ratio of 16:10) are used as parameters. In monitoring the screen as vertically long, the convergence angle does only to be set according to the short side. For example, when a 22" panel is used vertically and the monitoring distance is 0.8 m and if the convergence angle is set at 10 degrees, the video lights from the four corners of the screen can be effectively directed to the observer.

Similarly, when a 15" panel is used as vertically long and the monitoring distance is 0.8 m and if the convergence angle is set at 7 degrees, the video lights from the four corners of the screen can be effectively directed to the observer. In this way, the brightness of the screen over the entire surface can be improved by directing the video lights around the screen to the observer, who is in the optimum position to monitor the center of the screen depending on the size of the liquid crystal display panel and whether it is used vertically long or horizontally long.

Next, as described above, the liquid crystal display panel is directed inward so that the light around the screen is directed to the observer when the observer faces the center of the screen.

Figure 10:
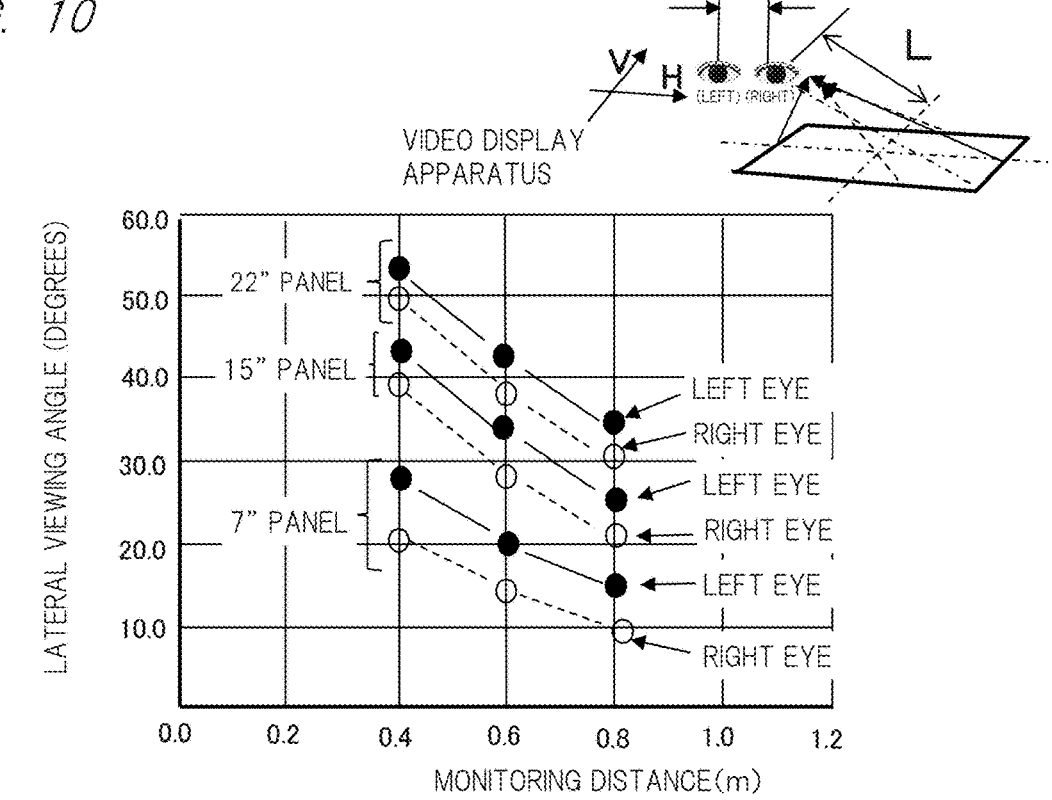
FIG. 10 a drawing for explaining a light source diffusion characteristic of the video display apparatus.

Further, when an average value of a distance between both eyes of an adult is 65 mm, the monitoring distance is used as a parameter for a screen-horizon-direction luminance difference of space floating videos generated by parallax between the left eye and the right eye. Its result is shown in FIG. 10. When the shortest monitoring distance in normal use is 0.8 m, a light source apparatus having such a characteristic that relative brightness does not become 50% or less may be used in a total of 12 degrees in which a difference in brightness due to the parallax is a monitoring angle (5 degrees) and a long-side convergence angle (7 degrees) shown in FIG. 9. As described above, since the optimum convergence angle is uniquely determined if the display position of the space floating video and the position (standing position) of the observer's eyes are determined, an inclination of a reflection surface of the light source apparatus is partially or continuously adjusted and the light source light is directed to a direction of the observer's eye of the space floating video. As a result, since the video light of the space floating video is also directed toward the observer's eyes, the over-entire-surface lightness of the space floating video viewed from the monitoring position is ensured.

Reflective Type Polarizer

A reflective type polarizer having a grid structure according to the present embodiment has reduced characteristics for light from a direction perpendicular to the polarization axis. Consequently, it is desirable that the reflective type polarizer has specifications along the polarization axis, and the light source of the present embodiment capable of emitting the video light emitted from the liquid crystal display panel at the narrow angle is an ideal light source. Further, similarly, the characteristics in the horizontal direction also deteriorate with respect to an oblique light. In consideration of the above characteristics, a configuration example of the present embodiment in which a light source capable of emitting the video light emitted from the liquid crystal display panel at a narrower angle is used as a backlight of the liquid crystal display panel will be described below. This makes it possible to provide a high-contrast space floating video.

Video Display Apparatus

Next, a video display apparatus 1 of the present embodiment will be described with reference to the drawings. A video display apparatus of the present embodiment includes a video display element 11 (liquid crystal display panel) and, simultaneously, a light source apparatus 13 constituting a light source thereof, and, in FIG. 11, the light source apparatus 13 is shown as a developed perspective view together with the liquid crystal display panel.

Figure 11:
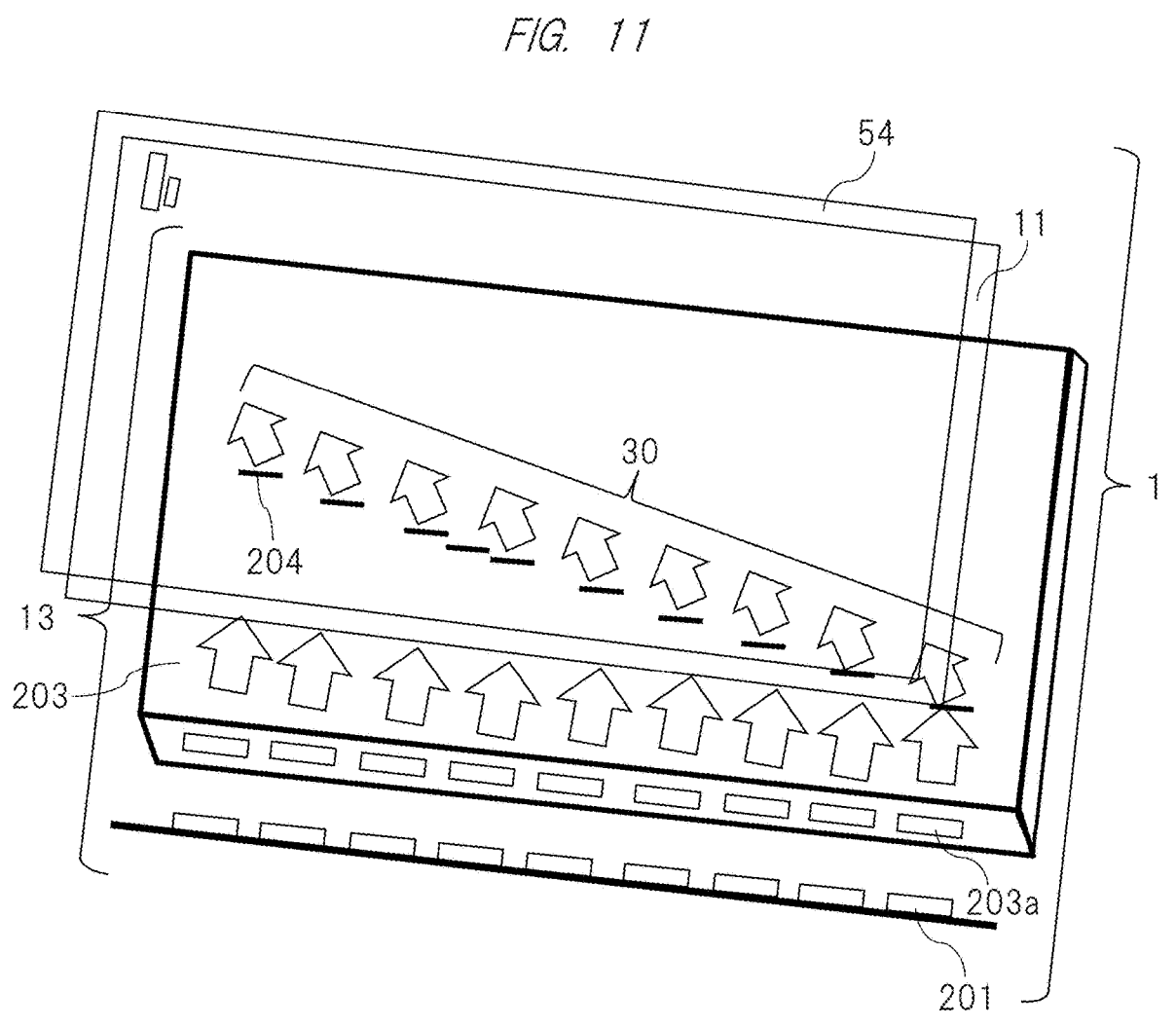

As shown by an arrow 30 in FIG. 11, the liquid crystal display panel (video display element 11) has a diffusion characteristic with a narrow angle due to light from the light source device 13 which is a backlight apparatus, that is, obtains an illumination light flux having strong directionality (straightness) and a characteristic similar to a laser light, whose polarization planes are aligned in one direction, reflects a video light modulated according to an inputted video signal by the retroreflector 2 to transmit the window glass 105, and forms the space floating video as a real image (see FIG. 1). Further, the video display apparatus 1 of FIG. 11 includes a liquid crystal display panel 11, an optical direction conversion panel 54 for controlling a directional characteristic of the light flux emitted from the light source apparatus 13, and a narrow-angle diffuser plate (not shown) if needed. That is, polarizers are provided on both sides of the liquid crystal display panel 11, and a video light having a specific polarization is emitted by modulating a light intensity with the video signal (see arrow 30 in FIG. 11).

Consequently, the desired video is projected as a light of a specific polarization, which has high directionality (straightness), toward the retroreflector 2 via the optical direction conversion panel 54, is reflected by the retroreflector 2, and is transmitted toward eyes of the observer outside a store (space) to form the space floating image 3. Incidentally, a protective cover 250 (see FIGS. 12 and 13) may be provided on a surface of the above-mentioned optical direction conversion panel 54.

In the present embodiment, in the video display apparatus 1 including the light source apparatus 13 and the liquid crystal display panel 11 in order to improve utilization efficiency of the light flux 30 emitted from the light source apparatus 13 and significantly reduce power consumption, the directionality can also be controlled so that the light from the light source apparatus 13 (see arrow 30 in FIG. 11) is projected toward the retroreflector 2, is reflected by the retroreflector 2, and then forms a floating video at a desired position by a transparent sheet (not shown) provided on the surface of the window glass 105. Specifically, this transparent sheet can control an imaging position of the floating video while imparting high directionality by an optical component such as a Fresnel lens or a linear Fresnel lens. According to this configuration, the video light from the video display apparatus 1 efficiently reaches the observer outside the show window 105 (for example, a sidewalk) with high directivity (straightness) like a laser beam. As a result, it is possible to display a high-quality floating video with high resolution and to significantly reduce the power consumption of the video display apparatus 1 including an LED element 201 of the light source apparatus 13.

First Example of Video Display Apparatus

Figures 12, 13:
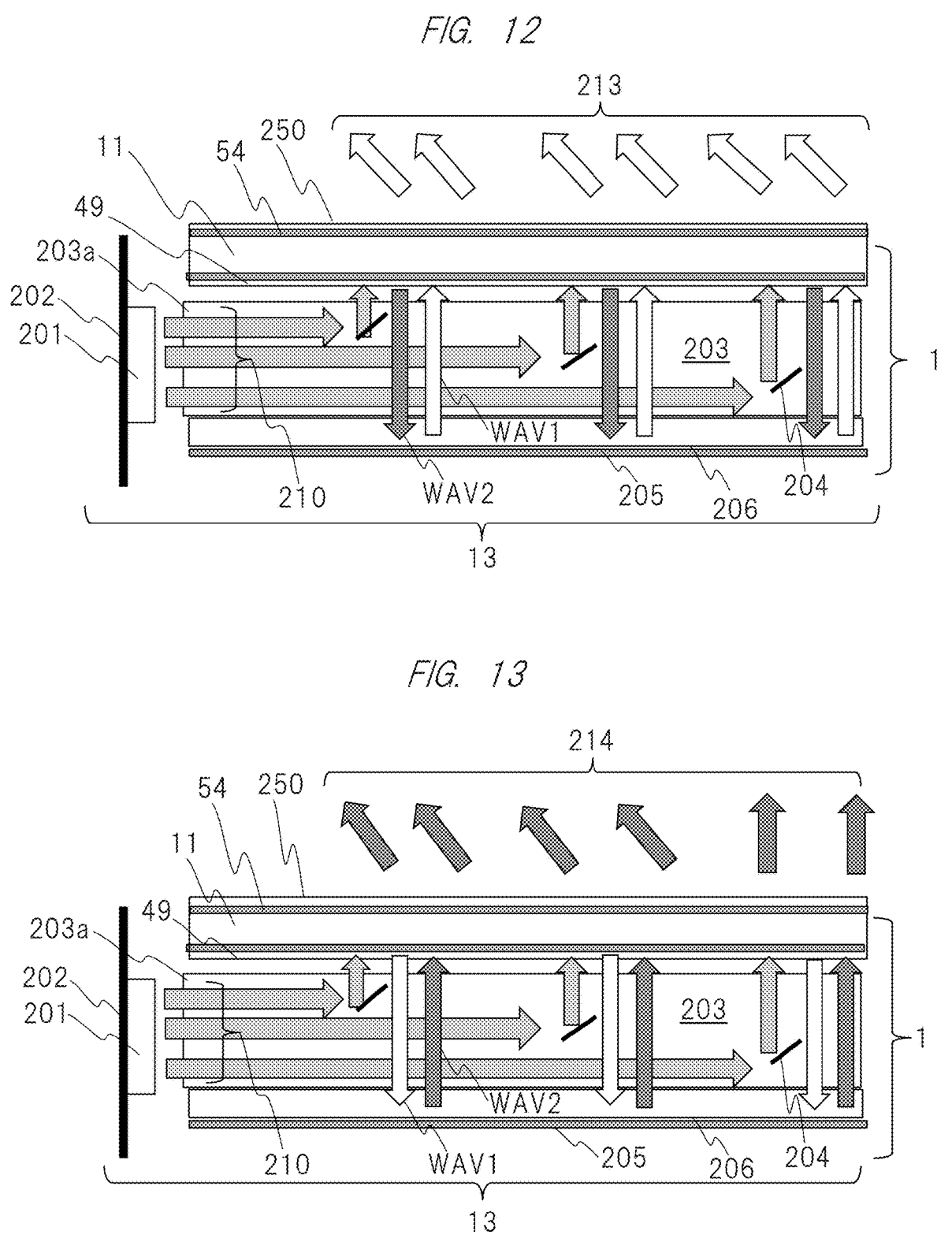

FIG. 11 is a diagram showing an example of a specific configuration of the video display apparatus 1. FIG. 12 is a sectional view showing an example of a specific configuration of the light source apparatus. As shown in FIG. 12, a liquid crystal display panel 11 and an optical direction conversion panel 54 are arranged on the light source apparatus 13 of FIG. 11. The light source apparatus 13 is formed of, for example, plastic or the like on a case shown in FIG. 11, and is configured by accommodating an LED (Light Emitting Diode) element 201 and a light guide body 203 inside the case. As shown in FIG. 12 and the like, an end face of the light guide body 203 has a lens shape that has, in order to convert a divergent light from each LED element 201 into a substantially parallel light flux, a cross-sectional area gradually increased face-to-face toward the light receiving portion and has a divergence angle gradually decreased by totally reflecting it a plurality of times in propagating inside. The liquid crystal display panel 11 constituting the video display apparatus 1 is attached to an upper surface thereof. Further, an LED element 201 which is a semiconductor light source and an LED substrate 202 on which a control circuit of the LED element 201 is mounted are attached to one side surface (left end surface in this example) of the case of the light source apparatus 13. Incidentally, a heat sink, which is a member for cooling heat generated by the LED element and the control circuit, may be attached to an outer surface of the LED substrate 202.

Further, attached to a frame (not shown) of the liquid crystal display panel attached to the upper surface of the case of the light source apparatus 13 are the liquid crystal display panel 11 attached to the frame, an FPC (Flexible Printed Circuits: flexible wiring board) (not shown) electrically connected to the liquid crystal display panel, and the like.

That is, the liquid crystal display panel 11, which is a liquid crystal display element, modulates the intensity of the transmitted light together with the LED element 201, which is a solid light source, based on a control signal from a control circuit (not shown) constituting an electronic device and generates a display video. Since the video light generated at this time has a narrow diffusion angle and contains only a specific polarization component, a non-conventional, new video display apparatus that is close to a surface-emitting laser video source driven by a video signal can be obtained. Incidentally, at present, it is technically and safety-wise impossible to obtain a laser light flux having the same size as that of the image obtained from the above-mentioned video display apparatus 1 by using the laser apparatus. Therefore, in the present embodiment, for example, light close to the above-mentioned surface-emitting laser video light is obtained by a light flux from a general light source provided with an LED element.

As described above, if the display position of the space floating image and the position (standing position) of the observer's eyes are determined, the optimum convergence angle is uniquely determined, so that the inclination of the reflective surface of the light source apparatus is continuously or continuously controlled and can direct the light source light in a direction of the observer's eyes of the space floating image. As a result, the video light of the space floating image is also directed in the direction of the observer's eyes, so that the over-entire-surface lightness of the space floating video viewed from the observing position is ensured.

Subsequently, a configuration of an optical system accommodated in the case of the light source apparatus 13 will be described in detail together with FIG. 12 with reference to FIG. 13. Since FIGS. 12 and 13 are cross-sectional views, only a plurality of LED elements 201 constituting a light source are shown as one element. In this optical system, incident light is converted to substantially collimated light due to a shape of the light receiving end surface 203a of the light guide body 203. Therefore, the light receiving portion of the end surface of the light guide body and the LED element are attached while maintaining a predetermined positional relationship. Incidentally, each of the light guides bodies 203 is made of a translucent resin such as acrylic. The LED light receiving surface at the end of the light guide body has, for example, a conical-convex-shape outer peripheral surface obtained by rotating a paraboloid cross-section, has a convex portion having a convex portion (that is, a convex lens surface) at a central portion thereof, and has a convex lens surface (or a concave lens surface recessed inward may be used) protruding outward in the central portion of a planar portion (not shown). Incidentally, an outer shape of the light receiving portion of the light guide body, to which the LED element 201 is attached, has a radial surface shape forming a conical outer peripheral surface, and has angles of the reflective surface and the radial surface, which are set so as to have such an angle that the light emitted from the LED element 201 in a peripheral direction can be totally reflected inside the light guide body.

On the other hand, each LED element 201 is arranged at a predetermined position on a surface of the LED substrate 202, which is a circuit board. The LED substrate 202 is arranged and fixed with respect to the LED collimator (light receiving end surface 203a) so that each of the LED elements 201 on the surface thereof is located at a central portion of the concave portion described above.

According to this configuration, the shape of the light receiving end surface 203a of the light guide body 203 makes it possible to take out the light radiated from the LED element 201 as substantially parallel light, and to improve the utilization efficiency of the generated light.

As described above, the light source apparatus 13 is configured by attaching a light source unit, in which a plurality of LED elements 201 as a light source are arranged on the light receiving end surface 203a as a light receiving portion provided on the end surface of the light guide body 203, and makes the divergent light flux from the LED element 201 substantially parallel light by the lens shape of the light receiving end surface 203a of the light guide body end surface, is guided inside the light guide body 203 (direction parallel to the drawing) as indicated by the arrows, and is emitted toward the liquid crystal display panel 11 arranged substantially parallel to the light guide body (in a direction perpendicular to the front from the drawing) by a light flux direction changing means 204. By optimizing a distribution (density) of the light flux direction changing means according to the shape of the inside or the surface of the light guide body, the uniformity of the light flux incident on the liquid crystal display panel 11 can be controlled. The above-mentioned light flux direction changing means 204 emits the light flux propagating in the light guide body toward the liquid crystal display panel 11 arranged substantially parallel to the light guide body (in the direction perpendicular to the front from the drawing) by providing, for example, a portion different in refractive index at a shape of the surface of the light guide body or inside the light guide body. At this time, if a relative brightness ratio when the brightness of the screen center and the brightness of the screen peripheral portion are compared in a state where the liquid crystal display panel 11 faces the screen center and a viewpoint is put at the same position as that of a diagonal dimension of the screen is 20% or more, there is practically no problem, or if the relative brightness ratio when comparing the brightness of the center of the screen and the peripheral portion of the screen with the liquid crystal display panel 11 facing the center of the screen and the viewpoint at the same position as the diagonal dimension of the screen is 20% or more or if it exceeds 30%, the characteristics will be even better.

Incidentally, FIG. 12 is a cross-sectional layout diagram for explaining a configuration of a light source of the present embodiment for polarization conversion and its action in the light source apparatus 13 including the light guide body 203 and the LED element 201 described above. In FIG. 12, the light source apparatus 13 is configured by, for example, a light guide body 203 provided with a light flux direction changing means 204 on a surface or inside formed of plastic or the like, an LED element 201 as a light source, a reflective sheet 205, and a reflective polarizer 206, a lenticular lens, and the like. A liquid crystal display panel 11 having a polarizer on a light source light incident surface and a video light emission surface is attached to the upper surface of the light source apparatus 13.

Further, a film or sheet-shaped reflective polarizer 49 is provided on the light source light incident surface (lower surface in the figure) of the liquid crystal display panel 11 corresponding to the light source apparatus 13. The reflective polarizer 49 selectively reflects a one-side polarization (for example, P wave) WAV2 out of a natural light flux 210 emitted from the LED element 201, and is reflected by the reflective sheet 205 provided on one surface (lower part of the figure) of the light guide body 203, and is directed toward the liquid crystal display panel 52 again. Therefore, a phase difference plate (λ/4 plate) is provided between the reflective sheet 205 and the light guide body 203 or between the light guide body 203 and the reflective polarizer 49, and the reflected light flux is reflected by the reflective sheet 205 and is converted from P-polarized light to S-polarized light by passing the phase difference plate twice, thereby improving usage efficiency of the light source light as video light. The video light flux whose light intensity is modulated by the video signal on the liquid crystal display panel 11 (arrows 213 in FIG. 12) is incident on the retroreflector 2 and passes through the window glass 105 after the reflection as shown in FIG. 1 and the space floating image, which is a real image inside or outside the store (space), can be obtained.

FIG. 13 is a cross-sectional layout diagram for explaining a configuration and an action of the light source of the present embodiment for polarization conversion in the light source apparatus 13 including the light guide body 203 and the LED element 201 similarly to FIG. 12. Similarly, the light source apparatus 13 of FIG. 13 is also configured by a light guide body 203 provided with a light flux direction changing means 204 on a surface or an inside formed of, for example, plastic etc., an LED element 201 as a light source, a reflective sheet 205, and a reflective polarizer 206, a lenticular lens, and the like. A liquid crystal display panel 11 having a polarizer on a light source light incident surface and a video light emission surface is attached to an upper surface of the light source device 13 as a video display element.

Further, a film or sheet-shaped reflective polarizer 49 is provided on a light source light incident surface (lower surface in the figure) of the liquid crystal display panel 11 corresponding to the light source apparatus 13. One-side polarization (for example, S wave) WAV1 out of natural light flux 210 emitted from the LED element 201 is selectively reflected by the reflective polarizer 49, is reflected by the reflective sheet 205 provided on one surface (lower part of the figure) of the light guide body 203, and is directed toward the liquid crystal display panel 11 again. A phase difference plate ($\lambda$/4 plate) is provided between the reflective sheet 205 and the light guide body 203 or between the light guide body 203 and the reflective polarizer 49, and the one-side polarization out of the natural light flux 210 emitted from the LED element 201 is reflected by the reflective sheet 205, and the reflective light flux is converted from S polarization to P polarization by passing the reflective sheet 25 twice. This makes it possible to improve the usage efficiency of the light source light as a video light. The video light flux, whose light intensity is modulated by the video signal on the liquid crystal display panel 11 (arrows 214 in FIG. 13), is incident on the retroreflector 2 and, as shown in FIG. 1, passes through the window glass 105 after the reflection and generates a space floating image which is a real image inside or outside the store (space).

In the light source apparatus shown in FIGS. 12 and 13, besides the action of the polarizer provided on the light incident surface of the corresponding liquid crystal display panel 11, a contrast ratio theoretically obtained is a product of inverse of cross transmittance of the reflective polarizer and inverse of cross transmittance obtained by the two polarizers attached to the liquid crystal display panel since the reflective polarizer reflects the other-side polarization components. This makes it possible to obtain high contrast performance. In fact, it is confirmed by experiments that the contrast performance of the displayed image has been improved by 10 times or more. As a result, a high-quality video comparable to that of a self-emitting organic EL was obtained.

Second Example of Video Display Apparatus

Figure 14:
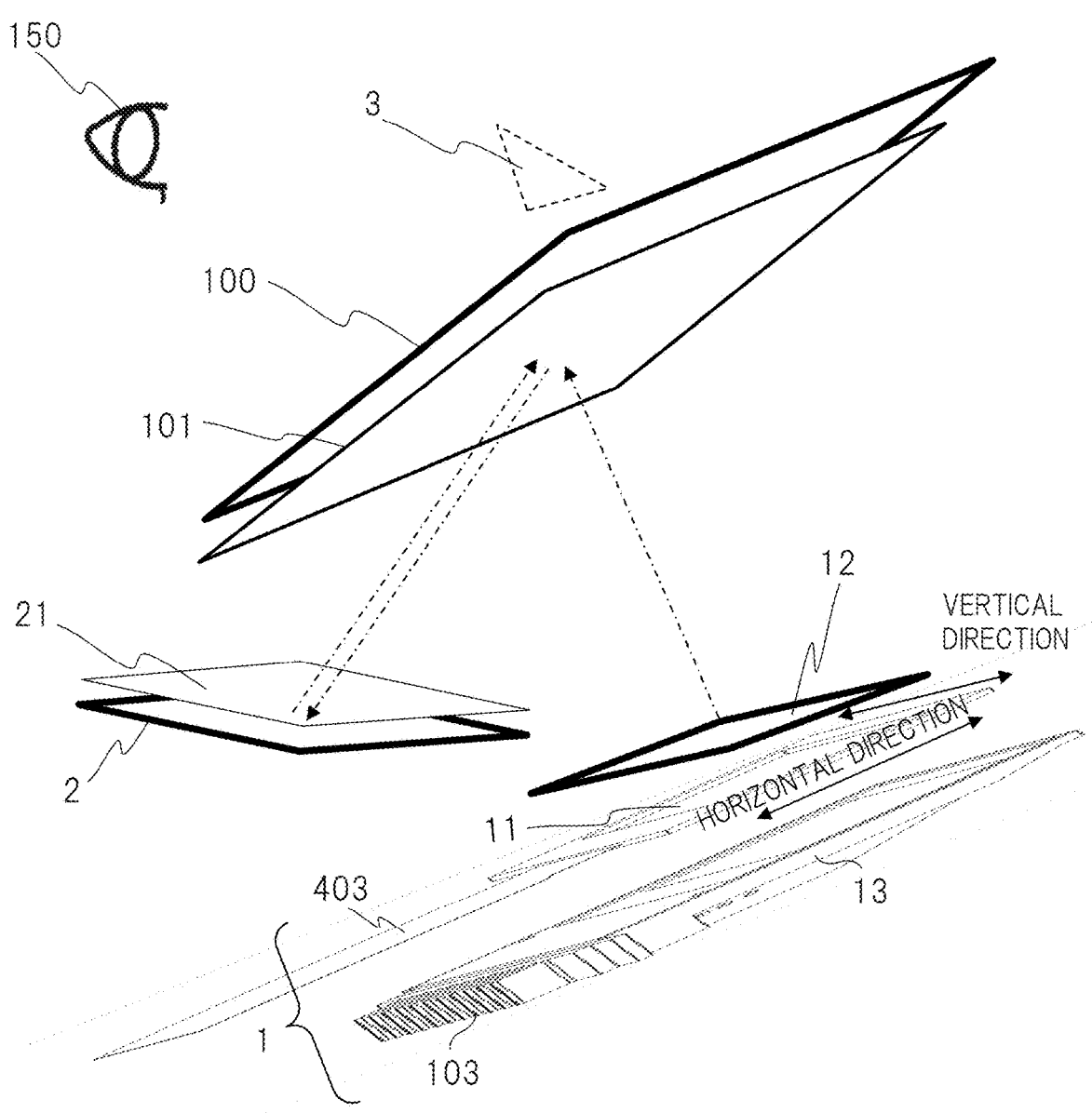
FIG. 14 is a layout drawing showing a main part of the space floating video information display system according to the embodiment of the present invention.

FIG. 14 shows another example of a specific configuration of the video display apparatus 1. A light source apparatus 13 of FIG. 14 is similar to the light source apparatus of FIG. 17 and the like. The light source apparatus 13 is configured by accommodating an LED, a collimator, a synthetic diffusion block, a light guide body, and the like in a case such as plastic. A liquid crystal display panel 11 is attached to an upper surface of the light source apparatus 13. Further, attached on one side surface of the case of the light source apparatus 13 are LED (Light Emitting Diode) elements 14a, 14b which are semiconductor light sources, and an LED substrate 102 on which a control circuit of the LED element is mounted (see FIGS. 16 and 17). A heatsink 103, which is a member for cooling heat generated by the LED element and the control circuit, is attached to an outer surface of the LED substrate 102.

Further, attached to a liquid crystal display panel frame attached to the upper surface of the case are the liquid crystal display panel 11 attached to the frame, and the FPC (Flexible Printed Circuits: flexible wiring board) 403 (see FIG. 7) electrically connected to the liquid crystal display panel 11, and the like. That is, the liquid crystal display panel 11 which is a liquid crystal display element generates the display video by modulating the intensity of the transmitted light based on the control signal from the control circuit (not shown here) constituting the electronic device together with the LED elements 14a, 14b.

Third Example of Video Display Apparatus

Subsequently, another example of a specific configuration of a video display apparatus 1 will be described with reference to FIG. 15. A light source apparatus of the video display apparatus 1 converts a divergent light flux of natural light (a mixture of P polarization and S polarization) from the LED into a substantially parallel light flux by the LED collimator 15, and reflects the substantially parallel light flux toward the liquid crystal display panel 11 by the reflective light guide body 304. The reflected light is incident on a wave plate and the reflective polarizer 49 that are arranged between the liquid crystal display panel 11 and the reflective light guide body 304. A specific polarization (for example, S polarization) is reflected by the reflective polarizer 49, the phase is converted by the wave plate and is returned to the reflection surface, passes through the reflective polarizer 49 again, and is converted into the polarization (for example, P polarization) transmitting the reflective polarizer 49.

Figure 16:
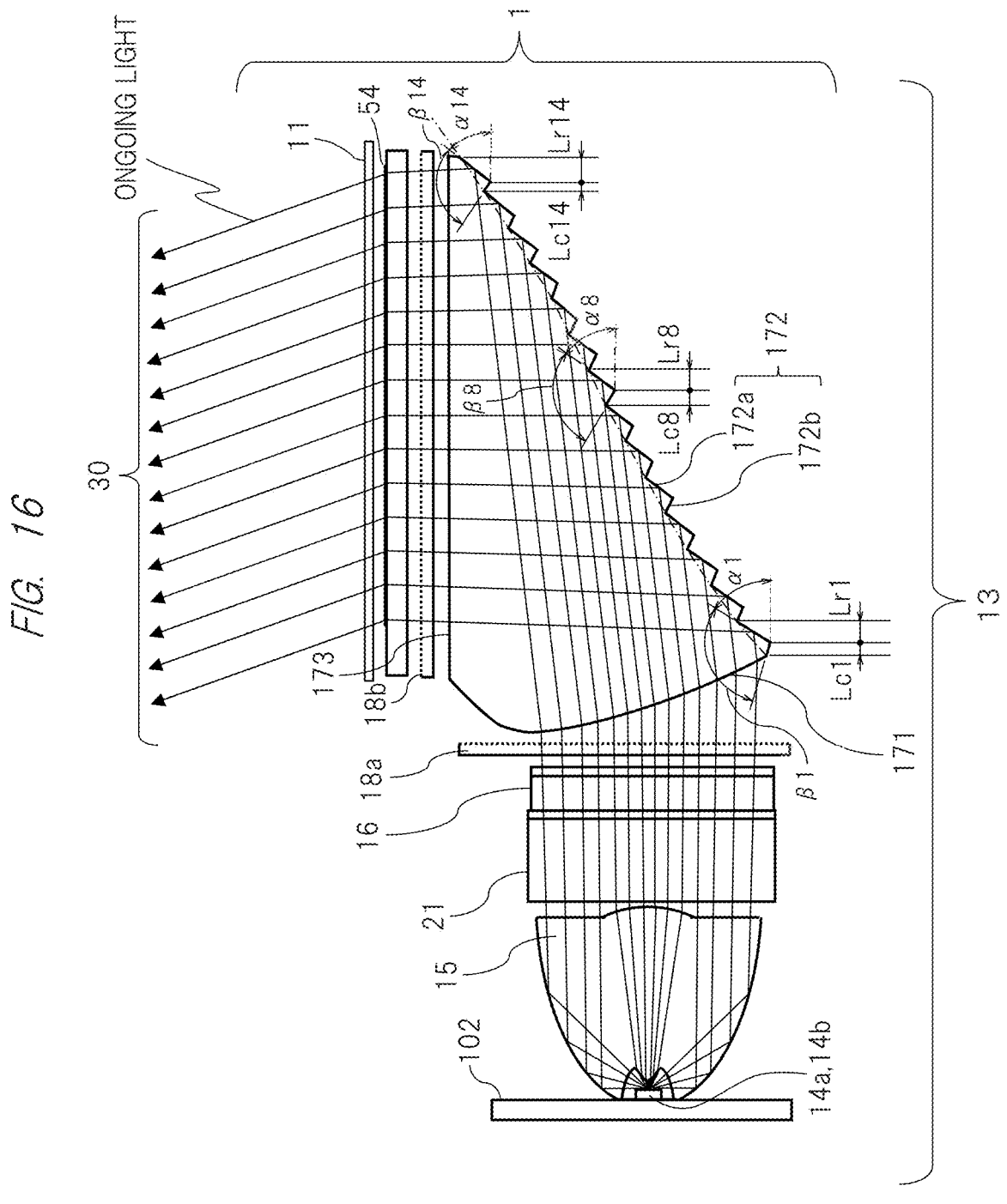
FIG. 16 is a sectional drawing showing an example of a specific configuration of the light source apparatus.

As a result, the natural light from the LED is aligned with specific polarization (for example, P polarization), the specific polarization is incident on the liquid crystal display panel 11, is luminance-modulated according to the video signal, and displays the video on the panel surface. FIG. 16 shows a plurality of LEDs constituting the light source, as in the above example. However, since FIG. 16 is a vertical sectional view, only one LED is shown. Each of these LEDs is attached to a predetermined position with respect to the LED collimator 15. Incidentally, each LED collimator 15 is made of a translucent resin such as acrylic or glass. Then, the LED collimator 15 has a conical-convex outer peripheral surface obtained by rotating a parabolic cross section, and has a concave portion having a convex portion (that is, a convex lens surface) at a central portion of a top thereof. Further, a central portion of a flat surface portion has a convex lens surface protruding outward (or a concave lens surface recessed inward). Incidentally, the paraboloid surface forming the conical outer peripheral surface of the LED collimator 15 is set within an angle range at which the light emitted from the LED in the peripheral direction can be totally reflected inside the LED collimator. Alternatively, the reflecting surface is formed so as to be within an angle range at which the light emitted from the LED in the peripheral direction can be totally reflected inside the LED.

Figure 17:
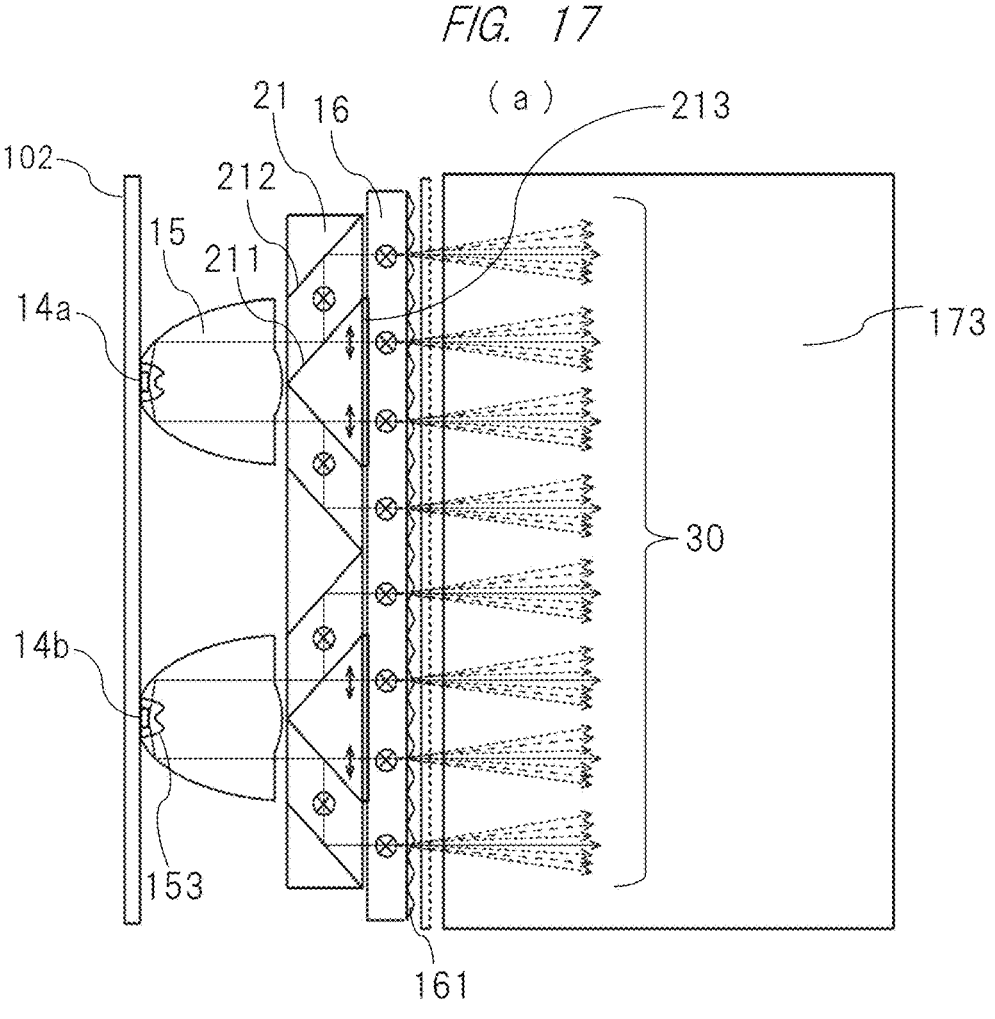
FIG. 17 is a sectional drawing showing an example of a specific configuration of the light source apparatus.
Figure 17:
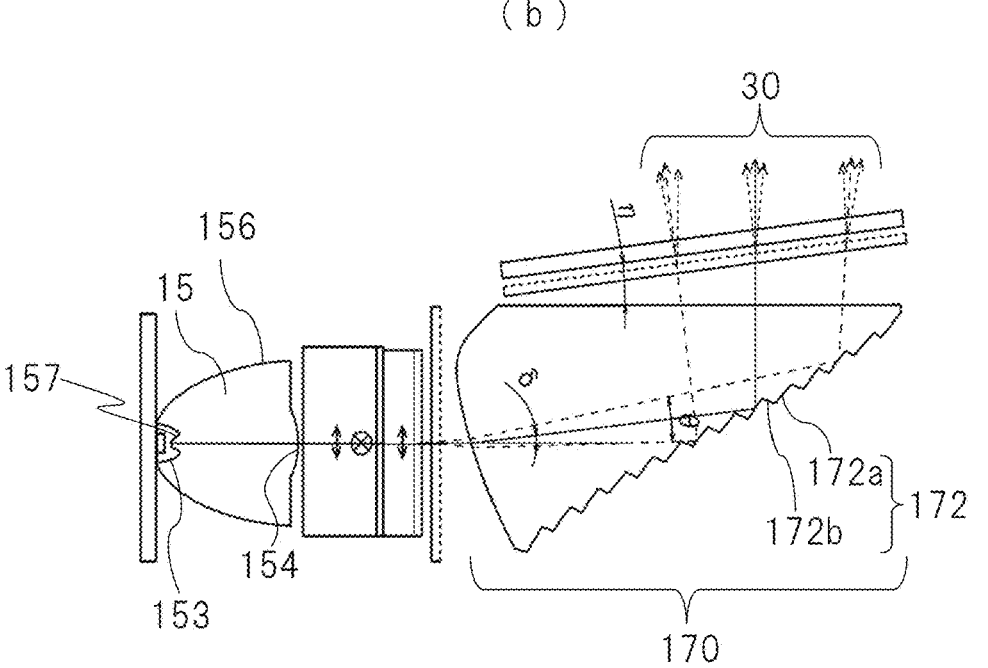

The above configuration is the same as that of the light source apparatus of the video display apparatus shown in FIGS. 16 and 17, etc. Further, the light converted into the substantially parallel light by the LED collimator 15 shown in FIG. 16 is reflected by the reflective light guide body 304, transmits the light of a specific polarization by the action of the reflective polarizer 49, and the light of the other polarization reflected is transmitted through the reflective light guide body 304 again and is reflected by the reflecting plate 271 provided on the other surface of the light guide body that is not in contact with the liquid crystal display panel 11. At this time, the light is polarization-converted by passing through the phase difference plate (λ/4 plate) 270 arranged between the reflector 271 and the liquid crystal display panel twice, and is transmitted through the reflective light guide body 304 again, is transmitted through the reflective polarizer 49 provided on an opposite surface, and is incident on the liquid crystal display panel 11 with the polarization directions aligned. As a result, all the light from the light source can be used, so that the utilization efficiency of the light is greatly improved (for example, doubled).

Figure 20:
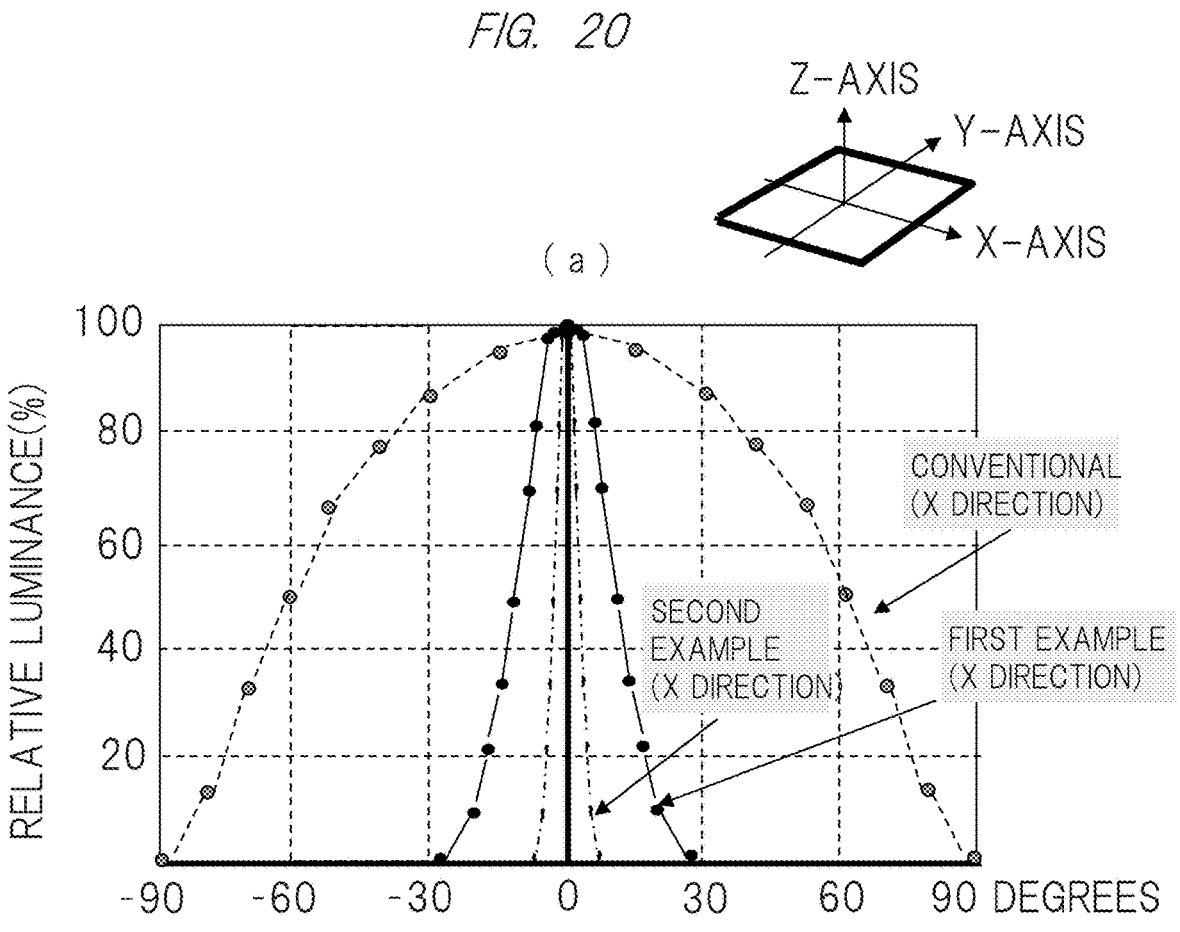
FIG. 20 is a drawing for explaining a diffusion characteristic of the video display apparatus.
Figure 20:
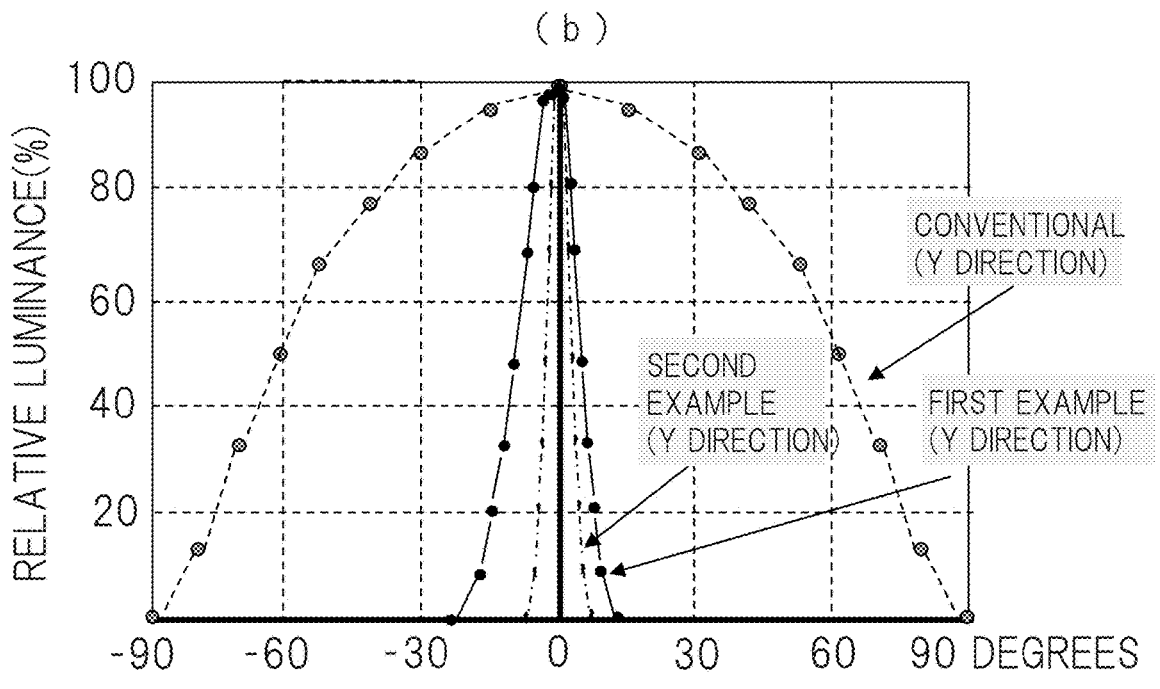

In a conventional TV set, ongoing light from the liquid crystal display panel has the same diffusion characteristics in both a screen horizontal direction (displayed on an X-axis in FIG. 20(*a*)) and a screen vertical direction (displayed on a Y-axis in FIG. 20(*b*)). In contrast, regarding a diffusion characteristic of the light flux emitted from the liquid crystal display panel of the present embodiment, a viewing angle becomes about ⅓ of the conventional 62 degrees by setting the viewing angle, in which brightness is 50% of a front view (angle of 0 degree), at 13 degrees, for example, as shown in a first example of FIG. 20. Similarly, the viewing angle in the vertical direction is uneven up and down, so that a reflection angle, an area of a reflection surface of the reflective light guide body, and the like are optimized so as to suppress an upper-side viewing angle at about ⅓ with respect to a lower-side viewing angle. As a result, an amount of video light directed in the monitoring direction is significantly improved in comparison with the conventional liquid crystal TV, and the brightness becomes 50 times or more.

Further, in the viewing angle characteristic shown in s second example of FIG. 20, the viewing angle, at which the brightness is 50% of the front view (angle of 0 degree), becomes ¹/₁₂ with respect to the conventional 62 degrees by being set to 5 degrees. Similarly, the viewing angle in the vertical direction is uneven up and down, so that the reflection angle, the area of the reflection surface, and the like of the reflective light guide body are optimized so as to suppress the viewing angle to about ¹/₁₂ with respect to the conventional angle. As a result, the amount of video light in the monitoring direction is significantly improved in comparison with the conventional liquid crystal TV, and the brightness becomes 100 times or more.

As described above, by setting the viewing angle at the narrowing angle, an amount of light flux toward the monitoring direction can be concentrated, so that utilization efficiency of light is greatly improved. As a result, even if the conventional liquid crystal display panel for TV is used, it is possible to realize a significant improvement in brightness with the same power consumption by controlling the light diffusion characteristics of the light source apparatus, and to use it as a video display apparatus corresponding to an information display system for the outdoors.

Figure 15:
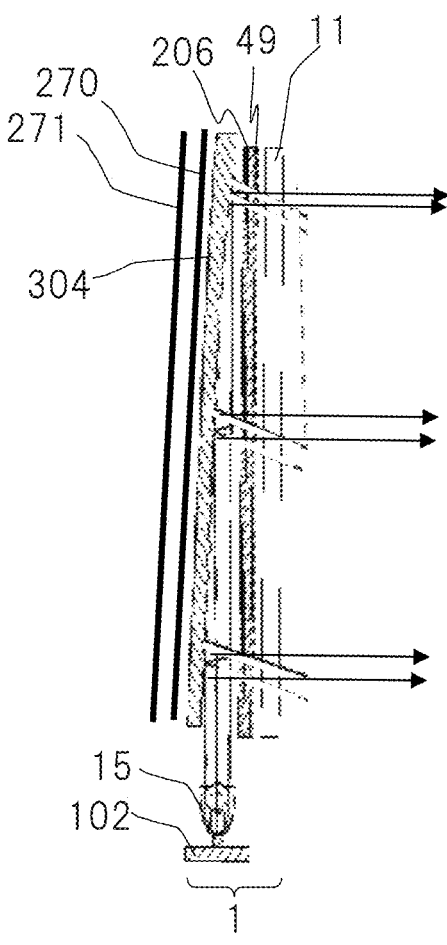
FIG. 15 is a sectional drawing showing a configuration of a video display apparatus which constitutes the space floating video information display system according to the embodiment of the present invention.

As a basic configuration, as shown in FIG. 15, a light flux having a narrow-angle directional characteristic is incident on the liquid crystal display panel 11 by the light source apparatus, and the luminance is modulated according to the video signal, so that video information displayed on the screen of the liquid crystal display panel 11 and a space floating video reflected by the retroreflector and obtained therefrom are displayed outdoors or indoors via the window glass 105.

First Example of Light Source Apparatus

Subsequently, a configuration of an optical system such as a light source apparatus accommodated in a case will be described in detail with reference to FIGS. 17(*a*) and 17(*b*) together with FIG. 16.

FIGS. 16 and 17 show LED elements 14*a*, 14*b* constituting a light source, which are attached at predetermined positions with respect to LED collimators 15. Incidentally, each of the LED collimators 15 is made of a translucent resin such as acrylic. Then, as shown in FIG. 17(*b*), the LED collimator 15 has a conical-convex outer peripheral surface 156 obtained by rotating a parabolic cross-section, and its top has a concave portion 153 forming a convex portion (convex lens surface) at a central portion. Further, a central portion of a flat surface portion has a convex lens surface 154 protruding outward (or a concave lens surface recessed inward). Incidentally, the paraboloid surface forming the conical outer peripheral surface 156 of the LED collimator 15 is set within an angle range within which the light emitted from the LED elements 14, 14*b* in the peripheral direction can be totally reflected inside, or a reflection surface is formed.

Further, the LED elements 14*a*, 14*b* are respectively arranged at predetermined positions on a surface of an LED substrate 102, which is a circuit board thereof. The LED substrate 102 is arranged and fixed to the LED collimator 15 so that the LED element 14*a* or 14*b* on the surface thereof is respectively located at a central portion of the concave portion 153.

According to such a configuration, among the light beams radiated from the LED element 14*a* or 14*b* by the LED collimator 15 described above, the light beams radiated upward (to the right in the figure) from the central portion thereof particularly are condensed by two convex lens surfaces 157, 154 forming an outer shape of the LED collimator 15 and become a parallel light beam. Further, the light beams emitted from the other portion toward the peripheral direction are reflected by the paraboloid forming the conical outer peripheral surface of the LED collimator 15, and are similarly condensed and become a parallel light beam. In other words, according to the LED collimator 15 in which a convex lens is formed at the central portion thereof and a paraboloid is formed at a peripheral portion thereof, almost all the light beams generated by the LED element 14*a* or 14*b* can be taken out as a parallel light beam, which makes it possible to improve the utilization efficiency of the generated light beams.

Incidentally, a polarization conversion element 21 is provided on a light ongoing side of the LED collimator 15. As is clear from FIG. 17, the polarization conversion element 21 is configured so as to combine a columnar (hereinafter, parallelogram) translucent member having a parallelogram cross-section and a columnar (hereinafter, triangular column) translucent member having a parallelogram cross-section and be plurally arranged in an array in parallel with a plane orthogonal to an optical axis of the parallel light from the LED collimator 15. Further, an interface between the adjacent translucent members arranged in an array is alternately provided with a polarizing beam splitter (hereinafter abbreviated as "PBS film") 211 and a reflection film 212. Furthermore, a λ/2 phase plate 213 is provided on an ongoing surface from which the light incident on the polarization conversion element 21 and transmitting the PBS film 211 is emitted.

In addition, a rectangular synthetic diffusion block 16 shown also in FIG. 17(*a*) is provided on the ongoing surface of the polarization conversion element 21. That is, the light emitted from the LED element 14*a* or 14*b* becomes parallel light by the action of the LED collimator 15 and enters the synthetic diffusion block 16, diffused by a texture 161 on an ongoing side, and then reaches to the light guide body 17.

The light guide body 17 is a member formed of a translucent resin such as acrylic into a rod shape having a substantially triangular cross-section (see FIG. 17(*b*)) and, as is clear from FIG. 16, includes: a light-guide-body light incidence portion (plane) 171 facing an ongoing surface of the synthetic diffusion block 16 via a first diffuser plate 18*a*; a light-guide-body light reflection portion (plane) 172 forming a slope; and a light-guide-body light emission portion (plane) 173 facing the liquid crystal display panel 11, which is a liquid crystal display element, via a second diffuser 18*b*.

As shown in FIG. 17 which is a partially enlarged view, a large number of reflection surfaces 172*a* and connection surfaces 172*b* are alternately serrated on the light-guide-body light reflection portion (plane) 172 of the light guide body 17. Then, the reflection surface 172*a* (a line segment rising to the right in the figure) forms an angle α*n* (n: a natural number, for example, 1 to 130 in this example) with respect to a horizontal plane shown by a dash-single-dot line in FIG. 16. As one example thereof, here, the angle α*n* is set to 43 degrees or less (however, 0 degrees or more).

The light-guide-body light incidence portion (plane) 171 is formed in a curved convex shape inclined on a light source side. According to this, the parallel light from the ongoing surface of the synthetic diffusion block 16 is diffused and incident via the first diffuser 18*a*, and, as is clear from the figure, reaches the light-guide-body light reflection portion (plane) 172 while being slightly bent (deflected) upward by the light-guide-body light incident portion (plane) 171, and is reflected here to reach the liquid crystal display panel 11 provided on the upper ongoing surface in the figure.

According to the video display apparatus 1 described in detail above, it is possible to further improve the light utilization efficiency and its uniform lighting characteristics, and, at the same time, to manufacture the video display apparatus 1 in a small size and at low cost including a modularized S-polarized-wave light source apparatus. Incidentally, in the above description, the polarization conversion element 21 has been described so as to be attached after the LED collimator 15, but the present invention is not limited thereto, and the same action and effect can be obtained also by being providing in an optical path leading to the liquid crystal display panel 11.

Incidentally, a large number of reflection surfaces 172*a* and connection surfaces 172*b* are alternately formed in a sawtooth shape on the light-guide-body light reflection portion (surface) 172, and an illumination light beam is totally reflected on each reflection surface 172*a*, is directed upward, is incident on an optical direction conversion panel 54 for controlling directivity characteristics as a substantially parallel diffused light flux by providing a narrowing angle diffuser plate on the light-guide-body emission portion (plane) 173, and is incident on the liquid crystal display panel 11 from an oblique direction. In the present embodiment, the light direction conversion panel 54 is provided between the light-guide-body light emission portion 173 and the liquid crystal display panel 11, but the same effect can be obtained also by providing it on the ongoing surface of the liquid crystal display panel 11.

Second Example of Light Source Apparatus

Figure 18:
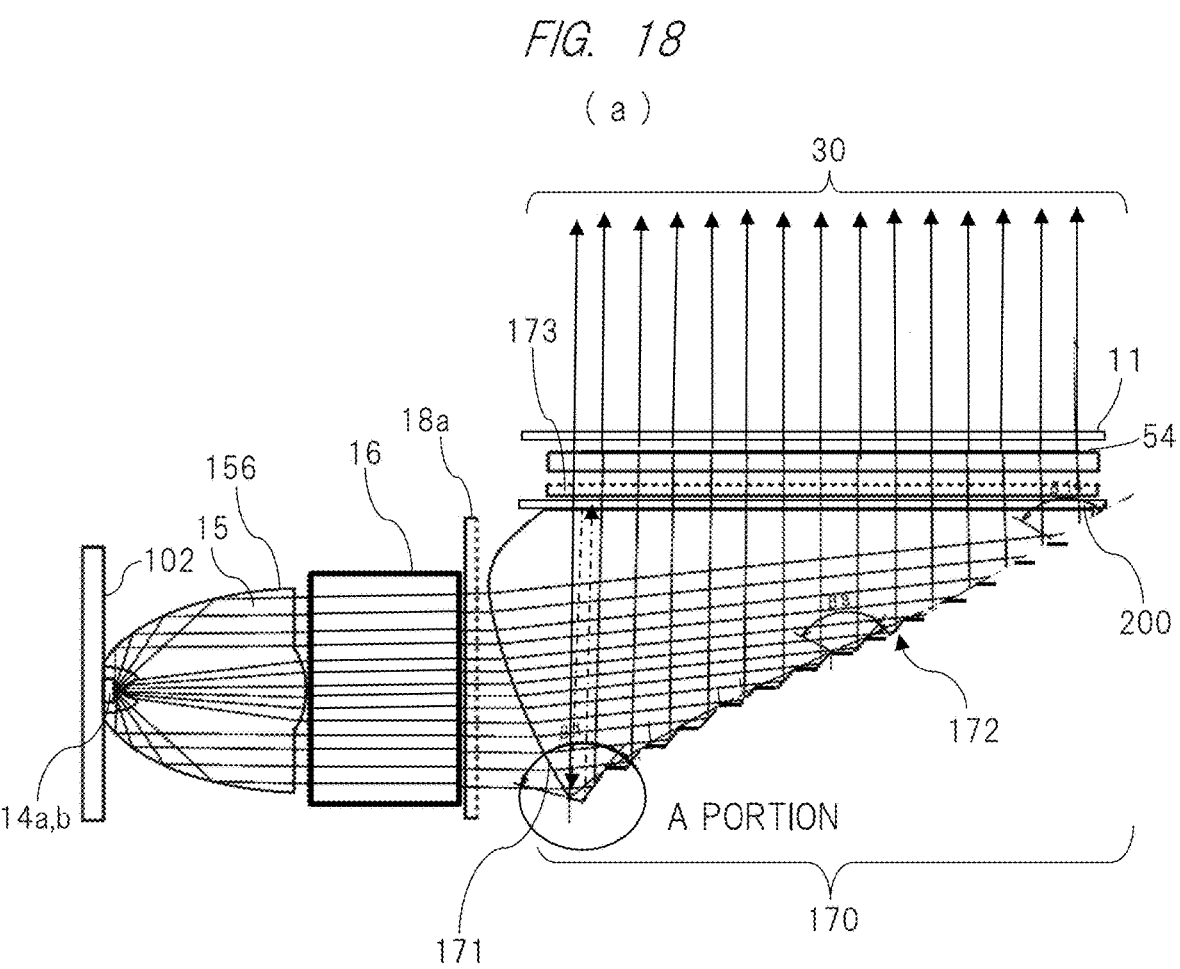
FIG. 18 is a sectional drawing showing an example of a specific configuration of the light source apparatus.
Figure 18:
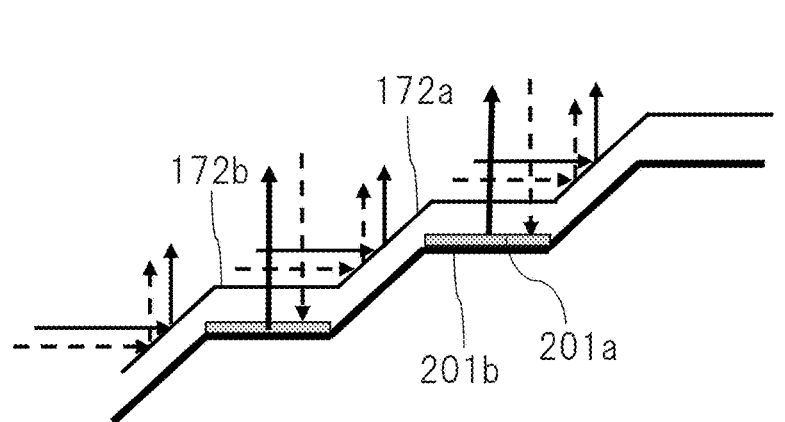

FIG. 18 shows another example of a configuration of an optical system such as the light source apparatus 13. Similar to the example shown in FIG. 17, a plurality of (two in this example) LED elements 14*a*, 14*b* constituting the light source are shown, and these are attached to the LED collimator 15 at predetermined positions. Incidentally, each of the LED collimators 15 is made of a translucent resin such as acrylic. Then, like the example shown in FIG. 17, this LED collimator 15 has a conical convex outer peripheral surface 156 obtained by rotating a parabolic cross-section, and its top has a concave portion 153 forming a convex portion (that is, a convex lens surface) 157 at its central portion. Further, a central portion of the flat surface portion has a convex lens surface 154 protruding outward (or a concave lens surface recessed inward). Incidentally, the paraboloid surface forming the conical outer peripheral surface 156 of the LED collimator 15 is set within an angle range at which the light emitted from the LED element 14*a* in the peripheral direction can be totally reflected inside the paraboloid surface, or a reflection surface is formed.

Further, the LED elements 14*a*, 14*b* are respectively arranged at predetermined positions on the surface of the LED substrate 102, which is a circuit board thereof. The LED substrate 102 is arranged and fixed to the LED collimator 15 so that the LED element 14*a* or 14*b* on the surface thereof is respectively located at the central portion of the concave portion 153.

According to such a configuration, among the light beams radiated from the LED element 14*a* or the LED element 14*b* by the LED collimator 15 described above, the light beams radiated particularly upward (to the right in the figure) from the central portion thereof are condensed by the two convex lens surfaces 157, 154 forming the outer shape of the LED collimator 15, and become parallel light. Further, the light beams emitted from the other portion toward the peripheral direction are reflected by the paraboloid forming the conical outer peripheral surface of the LED collimator 15, and is similarly condensed and become parallel light. In other words, according to the LED collimator 15 in which a convex lens is formed in the central portion thereof and a paraboloid is formed in the peripheral portion thereof, almost all the light beams generated by the LED element 14*a* or 14*b* can be taken out as parallel light, which makes it possible to improve the utilization efficiency of the generated light.

Incidentally, a light guide body 170 is provided on a light ongoing side of the LED collimator 15 via a first diffuser 18*a*. The light guide body 170 is a member that is made of a translucent resin such as acrylic and is formed into a rod shape having a substantially triangular cross-section (see FIG. 18(*a*)). As is clear from FIG. 18(*a*), the light guide body 170 includes: a light-guide-body incidence portion (plane) 171 which is an incident portion of the light guide body 170 facing the ongoing surface of the synthetic diffusion block 16 via the first diffuser 18*a*; a light-guide-body light reflection portion (surface) 172 forming an incline; and a light-guide-body light emission portion (surface) 173 facing the liquid crystal display panel 11, which is a liquid crystal display element, via a reflective polarizer 200.

If, for example, a member having a property of reflecting a P polarization (transmitting an S polarization) is selected as a reflective polarizer 200, the P polarization among natural light emitted from the LED as the light source is reflected by the reflective polarizing plate 200, passes through the λ/4 plate 201*a*, which is provided in the light-guide-body light reflection portion 172 of the light guide body shown in FIG. 18(*b*), to be reflected by the reflection surface 201*b*; and passes through the λ/4 plate 201*a* again, thereby being converted to the S polarization. Consequently, all the light flux incident on the liquid crystal display panel 11 is unified to S polarization.

Similarly, if, for example, a member having a property of reflecting S polarization (transmitting P polarization) is selected as a reflective polarizer 200, the S polarization among the natural light emitted from the LED that is a light source is reflected by the reflective polarizer 200, passes through the λ/4 plate 201*a*, which is provided in the light-guide-body light reflection portion 172 shown in FIG. 18(*b*), to be reflected by the reflection surface 201*b*, and passes through the λ/4 plate 201*a* again, thereby being converted to P polarization. Consequently, all the light flux incident on the liquid crystal display panel 52 is unified to the P polarization. Even the above-mentioned configuration can also realize the polarization conversion.

Third Example of Light Source Apparatus

Another example of a configuration of an optical system such as a light source apparatus will be described with reference to FIG. 15. In a third example, as shown in FIG. 15, a divergent light flux of natural light (mixture of P polarization and S polarization) from the LED substrate 102 is converted into a substantially parallel light flux by the LED collimator 15, and is reflected toward the liquid display panel 11 by a reflective light guide body 304. The reflected light is incident on a reflective polarizer 206 arranged between the liquid crystal display panel 11 and the reflective light guide body 304. Specific polarization (for example, S polarization) is reflected by the reflective polarizer 206, transmits a surface connecting the reflection surfaces of the reflective light guide body 304, and is reflected by a reflective plate 271 facing and arranged on an opposite surface of the reflective light guide body 304, is polarized and converted by passing through the phase difference plate (λ/4 wavelength plate) 270 twice, and transmits the light guide body and the reflective polarizer to be incident on the liquid crystal display panel 11, thereby being modulated to the video light. At this time, by matching the specific polarization and the polarized and converted polarization surface, the utilization efficiency of light becomes twice higher than a usual utilization efficiency, and a degree of polarization (extinguishing ratio) of the reflective polarizer is also added to an extinguishing ratio of the entire system, so that using the light source apparats of the present embodiment significantly improves a contrast ratio of the information display system.

As a result, the natural light from the LED is aligned with specific polarization (for example, P polarization). Similar to the above example, a plurality of LEDs constituting the light source are provided (however, only one is shown in FIG. 16 because of a vertical cross-section), and these are attached to the LED collimators 15 at predetermined positions. Incidentally, each LED collimator 15 is made of a translucent resin such as acrylic or glass. The LED collimator 15 has a conical convex outer peripheral surface obtained by rotating a parabolic cross-section and, simultaneously, its top has a concave portion forming a convex portion (that is, a convex lens surface) at a central portion thereof. Further, a central portion of its flat surface portion has a convex lens surface protruding outward (or a concave lens surface recessed inward). Incidentally, the paraboloid forming the conical outer peripheral surface of the LED collimator 15 is set within an angle range at which the light emitted from the LED collimator 15 in the peripheral direction can be totally reflected inside, or a reflection surface is formed.

Further, the LEDs are arranged at predetermined positions on the surface of the LED substrate 102, which is a circuit board thereof. The LED substrate 102 is arranged on and fixed to the LED collimator 15 so that the respective LEDs on the surface thereof are located at the central portion of the concave portion thereof.

According to such a configuration, among the light beams radiated from the LED by the LED collimator 15, the light beam radiated particularly from the central portion thereof is condensed by the two convex lens surfaces forming the outer shape of the LED collimator 15 and becomes parallel light. Further, the light beams emitted from the other portion toward the peripheral direction is reflected by the paraboloid forming the conical outer peripheral surface of the LED collimator 15, and is similarly condensed and becomes parallel light. In other words, according to the LED collimator 15 which configures a convex lens in the central portion thereof and forms a paraboloid in the peripheral portion thereof, almost all the light generated by the LED can be taken out as parallel light, and the utilization efficiency of the generated light can be improved.

Fourth Example of Light Source Apparatus

Figure 21:
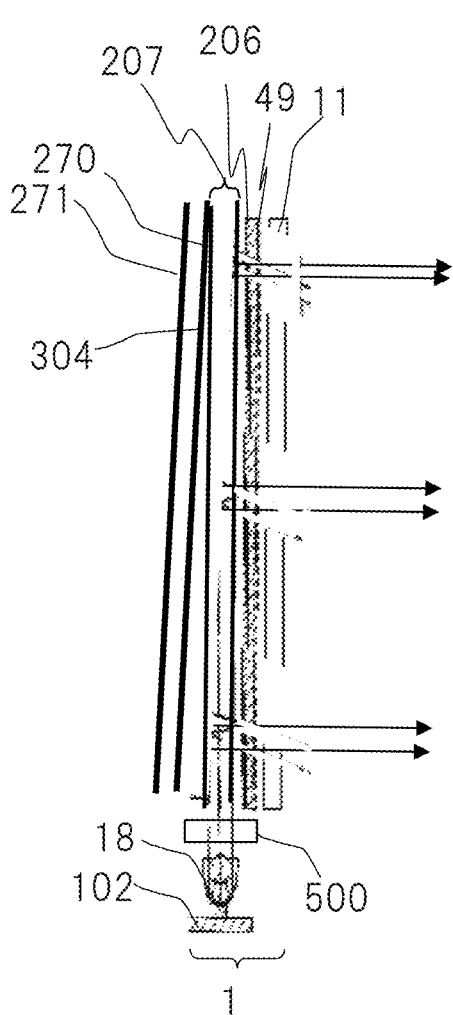
FIG. 21 is a sectional drawing showing a configuration of the video display apparatus which constitutes the space floating video information display system according to the embodiment of the present invention.

Further, another example of a configuration of an optical system such as a light source apparatus will be described with reference to FIG. 21. On the light ongoing side of the LED collimator 18, two optical sheets 207 that convert diffusion characteristics in the vertical direction and in the horizontal direction (not shown in a front-rear direction of the figure) are used, and the light from the LED collimator 18 is caused to be incident between the two optical sheets 207 (diffusion sheets). When the optical sheet 207 is composed of one sheet, the vertical and horizontal diffusion characteristics are controlled by fine shapes of the front surface and the back surface. Further, a plurality of diffusion sheets may be used to share its action. Depending on the front surface shape and back surface shape of the optical sheet 207, a diffusion angle of the light from the LED collimator 18 in a screen vertical direction is matched with a width of a vertical surface of a reflection surface of the diffusion sheet, and it is preferable to optimally design, as design parameters, the number of LEDs and the divergence angle from the optical element 500 so that a surface density of the light flux emitted from the liquid crystal display panel 11 in the horizontal direction becomes uniform. Namely, the diffusion characteristics are controlled by the surface shapes of the plurality of diffusion sheets instead of the light guide body. In the present embodiment, the polarization conversion is performed in the same manner as in the third example of the light source apparatus described above. In contrast, a polarization conversion element 21 may be provided between the LED collimator 18 and the optical sheet 207 to perform the polarization conversion, and the light source light may then be incident on the optical sheet 207.

If the above-mentioned reflective polarizer 206 is selected as a member having a characteristic of reflecting the S polarization (transmitting P polarization), the S polarization out of the natural light emitted from the LED as a light source is reflected, passes through the phase difference plate 270, is reflected by the reflection plate 271, passes through the phase difference plate 270 again, thereby being modulated to P polarization and being incident on the liquid crystal display panel 11. It is necessary to select the optimum value for a thickness of the phase difference plate according to the incident angle of the light beam onto the phase difference plate, and the optimum value exists in a range of λ/16 to λ/4.

Lenticular Lens

In order to control a diffusion distribution of the video light from the liquid crystal display panel 11, a lenticular lens is provided between the light source apparatus 13 and the liquid crystal display panel 11 or on the surface of the liquid crystal display panel 11 to optimum a lens shape, thereby being able to control emission characteristics in one direction. Further, arranging a microlens array in a matrix makes it possible to control the emission characteristics of the video light fluxes from the video display apparatus 1 in the X-axis and Y-axis directions and, as a result, to obtain the video display apparatus having the desired diffusion characteristics.

An operation of the lenticular lens will be described. Optimizing the lens shape of the lenticular lens makes it possible to efficiently obtain the space floating image by being emitted from the above-mentioned video display apparatus 1 and transmitted through or reflected by the window glass 105. That is, for the video light from the video display apparatus 1, two lenticular lenses are combined or the microlens arrays are arranged in a matrix to provide a sheet for controlling the diffusion characteristics, and the brightness (relative brightness) of the video light can be controlled in the X-axis and Y-axis directions according to the reflection angle (0 degree in the vertical direction). In the present embodiment, by such a lenticular lens, the luminance characteristics in the vertical direction are made steeper as shown in FIG. 20(b) in comparison with the conventional case, and by changing a balance of the directionality in the up-and-down direction (positive/negative direction of Y-axis), the brightness (relative brightness) of light due to reflection and diffusion is enhanced. In this way, such a video light that the diffusion angle is narrow (high straightness) and as to have only a specific polarization component is obtained like a video light from a surface-emitting laser image source. Therefore, it is possible to suppress the ghost image generated by the retroreflector in using the video display apparatus due to the conventional technique, and to be efficiently controlled so that the space floating image due to the retroreflection reaches the observer's eyes.

Further, by the above-mentioned light source apparatus, it has the significantly narrow-angle directionality in both the X-axis direction and the Y-axis direction with respect to the ongoing light diffusion characteristics (denoted as conventional case in the figure) from the general liquid crystal display panel shown in FIGS. 20(a) and 20(b), so that it is possible to realize the video display apparatus that emits the specific polarization light emitting the video light flux almost parallel to a specific direction.

Figure 19:
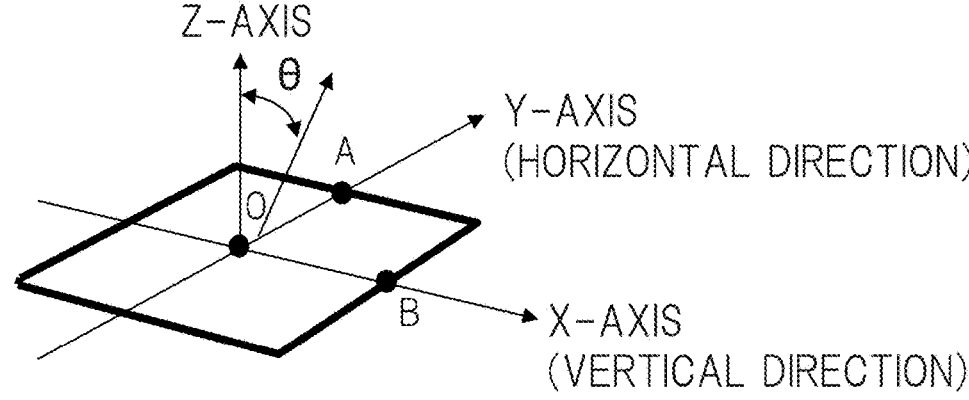
FIG. 19 is a drawing for explaining a diffusion characteristic of the video display apparatus.
Figure 19:
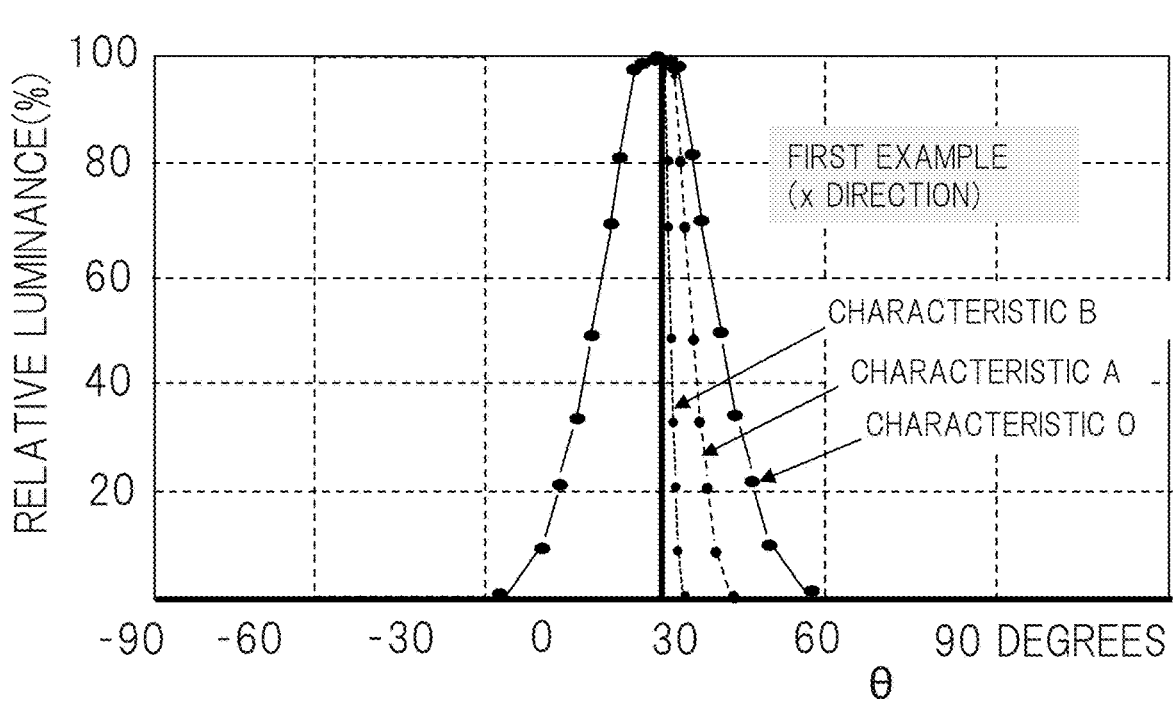

FIG. 19 shows an example of characteristics of the lenticular lens used in the present embodiment. In this example, in particular, the characteristic in the X direction (vertical direction) is shown, and "characteristic O" shows vertically symmetrical luminance characteristics in which a peak in the light ongoing direction is at an angle of about 30 degrees upward from the vertical, the characteristics A and B in FIG. 19 further show an example of characteristics in which the video light above the peak luminance is condensed at around 30 degrees to increase the luminance (relative luminance). Therefore, in these characteristics A and B, the luminance (relative luminance) of light is sharply reduced as compared with "characteristic O" at an angle exceeding 30 degrees.

That is, according to the above-mentioned optical system including the lenticular lens, when the video light flux from the video display apparatus 1 is incident on the retroreflector 2, the ongoing angle and the viewing angle of the video light aligned with the narrow angle by the light source apparatus 13 can be controlled, and a degree of freedom in installing the retroreflector 2 can be greatly improved. As a result, a degree of freedom of a relationship between image formation positions of the space floating image formed at a desired position by reflecting or transmitting the window glass 105 can be greatly improved. As a result, it is possible to efficiently reach the eyes of the observer outdoors or indoors as light having a narrow diffusion angle (high straightness) and only a specific polarization component. According to this, even if the intensity (luminance) of the video light from the video display apparatus 1 is reduced, the observer can accurately recognize the video light and obtain its information. In other words, by reducing an output of the video display apparatus 1, it is possible to realize an information display system with low power consumption.

Although various embodiments have been described in detail above, however, the present invention is not limited to the above-described embodiments and includes various modifications. For example, the above-described embodiment describes the entire system in detail in order to explain the present invention in an easy-to-understand manner, and is not necessarily limited to the one including all the described configurations. Further, it is possible to replace a part of the configuration of one embodiment with the configuration of another embodiment, and it is also possible to add the configuration of another embodiment to the configuration of one embodiment. Further, it is possible to add/delete/replace a part of the configuration of each embodiment with another configuration.

EXPLANATION OF REFERENCE NUMERALS

1 . . . Video display apparatus; 2 . . . Retroreflector; 3 . . . Space floating image (Space image); 3a, 3b, 3c, 3d . . . Optimal monitoring position display unit; 13 . . . Light source apparatus; 105 . . . Window glass; 100 . . . Member; 101 . . . Polarization separation member; 12 . . . Absorption type polarizer; 13 . . . Light source apparatus; 50 . . . Main body; 50a . . . Outer frame; 54 . . . Optical direction conversion panel; 55 . . . Camera unit; 56 . . . Sensor; 60 . . . Structural member; 151 . . . Retroreflector; 102, 202 . . . LED substrate; 203 . . . Light guide body; 205, 271 . . . Reflection plate; 206 . . . Reflective polarizer; 270 . . . Phase difference plate; 300 . . . Space floating image; 301 . . . Ghost image of space floating video; 302 . . . Ghost image of space floating video; G1 . . . First ghost image; G2 . . . Second ghost image; G3 . . . Third ghost image; G4 . . . Fourth ghost image; G5 . . . Fifth ghost image; and G6 . . . Sixth Ghost image.

The invention claimed is:

1. A space floating video display apparatus comprising:
a display panel that displays a video;
a light source apparatus that supplies light in a specific polarization direction to the display panel;
a retroreflection plate that reflects the video light from the display panel and displays a space floating video as a real image in air by the reflected light;
a light-shielding member that blocks a video light capable of forming a space floating video other than a desired space floating video among a plurality of space floating videos capable of being formed by the video light from the display panel; and
a polarization separation member that reflects video light having a specific polarization from the display panel toward the retroreflection plate, wherein the light-shielding member is arranged between the display panel and the polarization separation member.

2. The space floating video display apparatus according to claim 1,
wherein the light-shielding member has a frame shape surrounding a region through which a light flux of the video light forming the desired space floating video passes.

3. The space floating video display apparatus according to claim 1,
wherein the light-shielding member includes a frame surrounding a region through which a light flux of video light forming the desired space floating video passes, and
a plurality of plate-shaped beams are arranged toward a region through which a light flux of video light forming the desired space video passes.

4. The space floating video display apparatus according to claim 1, wherein an inner diameter of the light-shielding member defines an area that is 110% or less of an area of a region through which a normal video light flux forming the desired space floating video passes.

5. The space floating video display apparatus according to claim 4, wherein the inner diameter of the light-shielding member defines an area that is 104% or less of the area of the region through which the normal video light flux passes.

6. The space floating video display apparatus according to claim 1, wherein the light source apparatus includes a light guide body and a light source, and an end face of the light guide body has a lens shape configured to convert a divergent light from the light source into a substantially parallel light flux.

7. The space floating video display apparatus according to claim 1, wherein the light source apparatus comprises an LED collimator having a conical-convex outer peripheral surface obtained by rotating a parabolic cross-section.

8. The space floating video display apparatus according to claim 1, further comprising an absorption type polarizer provided on a video display surface of the display panel.

9. The space floating video display apparatus according to claim 1, further comprising a transparent member through which the space floating video is displayed, wherein an absorption type polarizer is provided on a surface of the transparent member.

10. The space floating video display apparatus according to claim 1, wherein the retroreflection plate has a concave surface or a convex surface having a curvature radius of 200 mm or more.

11. The space floating video display apparatus according to claim 1, wherein a pitch of the retroreflection plate is set to a non-integral multiple of a pixel pitch of the display panel to suppress moiré.

12. The space floating video display apparatus according to claim 1, wherein the light source apparatus includes a reflective polarizer and a phase difference plate configured to convert a polarization of light reflected by the reflective polarizer to a specific polarization direction supplied to the display panel.

13. A space floating video display apparatus comprising:
a display panel that displays a video;
a light source apparatus that supplies light in a specific polarization direction to the display panel;
a retroreflection plate that reflects the video light from the display panel and displays a space floating video as a real image in air by the reflected light;
a light-shielding member that blocks a video light capable of forming a space floating video other than a desired space floating video among a plurality of space floating videos capable of being formed by the video light from the display panel; and
a polarization separation member that reflects video light having a specific polarization from the display panel toward the retroreflection plate, wherein the light-shielding member is arranged between the polarization separation member and the retroreflection plate.

14. The space floating video display apparatus according to claim 13,
wherein the light-shielding member has a frame shape surrounding a region through which a light flux of the video light forming the desired space floating video passes.

15. The space floating video display apparatus according to claim 13,
wherein the light-shielding member includes a frame surrounding a region through which a light flux of video light forming the desired space floating video passes, and
a plurality of plate-shaped beams are arranged toward a region through which a light flux of video light forming the desired space video passes.

16. The space floating video display apparatus according to claim 13, wherein a distance between the light-shielding member and the retroreflection plate is 50% or less with respect to a distance between the retroreflection plate and the polarization separation member.

17. The space floating video display apparatus according to claim 16, wherein the distance between the light-shielding member and the retroreflection plate is 30% or less with respect to the distance between the retroreflection plate and the polarization separation member.

18. A space floating video display apparatus comprising:
a display panel that displays a video;
a light source apparatus that supplies light in a specific polarization direction to the display panel;
a retroreflection plate that reflects the video light from the display panel and displays a space floating video as a real image in air by the reflected light;
a light-shielding member that blocks a video light capable of forming a space floating video other than a desired space floating video among a plurality of space floating videos capable of being formed by the video light from the display panel; and
a polarization separation member that reflects video light of a specific polarization from the display panel toward the retroreflection plate, the light-shielding member comprises a plurality of light-shielding members, and the plurality of the light-shielding members include a light-shielding member arranged between the display panel and the polarization separation member, and the light-shielding member arranged between the polarization separation member and the retroreflection plate.

19. The space floating video display apparatus according to claim 18, wherein the light-shielding member has a frame shape surrounding a region through which a light flux of the video light forming the desired space floating video passes.

20. The space floating video display apparatus according to claim 18, wherein the light-shielding member includes a frame surrounding a region through which a light flux of video light forming the desired space floating video passes, and a plurality of plate-shaped beams are arranged toward a region through which a light flux of video light forming the desired space video passes.

\* \* \* \* \*